United States Patent [19]

Marschall

[11] Patent Number: 5,471,435
[45] Date of Patent: Nov. 28, 1995

[54] METHOD FOR ACOUSTIC/ELECTROMAGNETIC SIGNAL PROCESSING

[75] Inventor: Richard A. Marschall, Ft. Pierce, Fla.

[73] Assignee: Marshall Acoustics Pty., Ltd., Parramatta, Australia

[21] Appl. No.: 242,555

[22] Filed: May 13, 1994

[51] Int. Cl.⁶ .................................................. G01R 23/16
[52] U.S. Cl. .......................... 367/135; 342/196; 367/88
[58] Field of Search ............................. 367/7, 138, 135, 367/88; 73/602, 862.625; 324/144; 342/192, 196

[56] References Cited

U.S. PATENT DOCUMENTS 4,723,553  2/1988  Mimwa et al. ........................ 73/602

*Primary Examiner*—Daniel T. Pihulic
*Attorney, Agent, or Firm*—Nixon & Vanderhye

[57] ABSTRACT

A process for predictively modelling potential fields in inhomogeneous media is particularly suited for implementation as a Digital Signal Processing chip, as it rapidly predicts the potential field by repeatedly perturbing a trial field solution by a step approximation to the known inhomogeneous media, and then, with one Fast Fourier Transform and one Inverse Fast Fourier Transform, creates a second estimated field solution; a fixed number of such iterations provides a final potential field model, which may be compared with a sensed field to predictively adapt sensor arrays or beam shaping.

18 Claims, 30 Drawing Sheets process is repeated $n$ times

METHOD FOR ACOUSTIC/ELECTROMAGNETIC SIGNAL PROCESSING

BACKGROUND OF THE INVENTION

This patent relates to the field of processes for processing acoustical or electromagnetic signals, especially in inhomogeneous media. Since the acoustic and electromagnetic cases are for this invention, interchangeable, the acoustic case shall be used primarily herein for illustration and explanation. It will be apparent how the invention extends into other field phenomenon problems.

Such analysis of acoustical information is one of a number of problems of the class involving the calculation of a wave potential within a region based upon detected conditions at points within that region or at the boundaries of the region. Such problems include, but are not restricted to seismic, acoustic, radar field imaging and similar techniques; they are extremely important in the field of geophysical surveys which image an area of interest using arrays of acoustic, vibrational, magnetic, electrical, nuclear, or gravitational sensors. In each such case, the media through which the signal of interest propagates is naturally inhomogeneous, and the problem arises of predicting the desired signal, in the form of a field potential, at discrete sampling points (the sensor locations) given the inhomogeneous media.

It is typical that such sensor information is analyzed by detecting and displaying various acoustic or other velocity fields across the area.

It is known that the equation describing an acoustical velocity potential, the Helmholtz equation $\nabla^2 u + k^2 u = 0$ where u is the velocity potential and k is the wave number, could be solved in terms of boundary integral equations by the use of Green's theorems. However, such solutions are indeterminant at values of the wave number corresponding to the periods of the possible modes of simple harmonic vibration which may take place within a closed rigid envelope having the form of the boundary surface of the area being analyzed. Therefore, while the introduction of solid state electronic computers and associated numerical analysis techniques have made it feasible to analyze classical boundary integral equations, problems still exist in the area of avoiding non-uniqueness and non-existence problems and in the overall computational complexity of the chosen numerical techniques which may require extensive equipment such as supercomputers or extended periods of time for analysis even on the fastest available computers.

Wave propagation problems in inhomogeneous media, where the wave propagation velocity is variable in two or more directions, are presently solved almost exclusively using various variations and combinations of finite difference and finite element methods. Well-known papers describe finite difference methods and finite element methods for wave propagation problems. The literature for both of these methods is vast and deep. The solution of practical wave propagation problems using finite differences or finite elements generally involves the use of a supercomputer.

For certain frequency ranges and geometry restrictions, other methods exist that take advantage of simplifying assumptions. For example, "high" frequency waves in "gradually" varying media can often be approximated using a variety of "ray theoretical" methods. If the inhomogeneity is in only one direction, multitudes of other "range invariant" methods can be used. For many problems where the largest part of the media's wave propagation speed variation occurs in one coordinate direction, such as in underwater acoustics, range invariant techniques are still used, even if the results are less than ideal. Range invariant methods generally require a workstation computer (a few MFLOPS) to find solutions to practical problems in reasonable times (tens of minutes to hours). Ray theoretic methods, when they can be used, often require less computing power.

SUMMARY OF THE INVENTION

The object of this invention is to introduce a simple and quite general method to obtain predictive solutions for acoustic, electromagnetic, or thermal wave propagation in almost arbitrarily inhomogeneous media. Such predictive solutions serve as models of the expected signal, permitting suitable predictive wave shaping, beam shaping, and similar techniques for enhancing signal detection.

The inventive method, here called the Iterative Dual Domain Method or IDDM, has the significant ancillary benefit of being orders of magnitude faster than those in prevalent use.

The inventive process is an improved method for predicting the acoustical potential fields in known or estimated media by means of iterating a Green's function solution against a step wise perturbed data array representing a discrete coordinate set in the region being analyzed.

Real world seismic problems introduce singularities, such as surface discontinuities between media (air-water surfaces, for example), single-point transducers, and, for ground seismic studies, discontinuous media. Practical processing of such signals requires techniques which the inventive process analyzes acoustical signals by the process of sampling the signals over a chosen grid choosing the sampling so that the spatial frequency of the sampled signal is such that the highest frequency of interest is sampled at least twice.

The inventive process models or predicts an acoustic or electromagnetic field at a given wave number in inhomogeneous media.

The first step for given inhomogeneous media, sets a grid of locations within the media. For this set of locations points, the media is represented in terms of its wave velocity transmission by forming the media model set of data points corresponding to the wave velocity in said media at each said location.

Next, for each iteration desired, form a perturbed data set, one for each iteration desired. These sets span between homogeneous media, at which all points are identical, and the modelled media. There will be a series of such sets, each of which is an intermediate set of data points corresponding to homogeneous media and the media model set of data points; for each said set the data corresponding to a location sequentially changing from the data for homogeneous media to the data in the media model.

The iterative procedure for modelling the wave velocity field is to then repeatedly for said fixed number of iterations:

form the product of the first said set $\alpha$ and an estimated velocity field, G;

form the Fast Fourier Transform $\mathfrak{F}$ of said product $\mathfrak{F}\{\alpha G\}$;

forming the product $$\frac{-1-\kappa_0^2 \mathcal{F}\{\alpha G\}}{\kappa_0^2 - (\Omega_x^2 + \Omega_y^2)}$$

where $k_0$ is the constant component of the wave number;

form the Inverse Fast Fourier Transform of the transformed product; and repeat the iteration.

The final result represents the velocity field at the location points chosen, and may be used to tune or adapt the acoustic sensor array, or to tune or beamform a radar beam, or to otherwise provide a comparison prediction of the field against which real data may be compared.

The inventive process involves only one forward and one reverse Fast Fourier Transform per iteration, and typically requires less than 50 iterations. It is thus a particularly fast estimation process for judging the effect of media on an acoustic or electromagnetic field. Further, it is particularly adapted to implementation in a Digital Signal Processing DSP chip for local real time acoustic field processing.

It is thus an object of the invention to disclose a process for predicting an acoustic or electromagnetic wave field in a media for near real time adapting of sensor array or fields.

It is a further object of the invention to disclose a process for analysis of acoustic fields in inhomogeneous media which is suitable for implementation in small computers or electronic processors at the chip or board level.

It is a further object of the invention to disclose a process for predictive analysis of acoustic fields in media which provides comparative displays of acoustic field data.

These and other objects of the invention may be seen in the detailed description which follows.

DETAILED DESCRIPTION OF THE INVENTION

Figure 1:
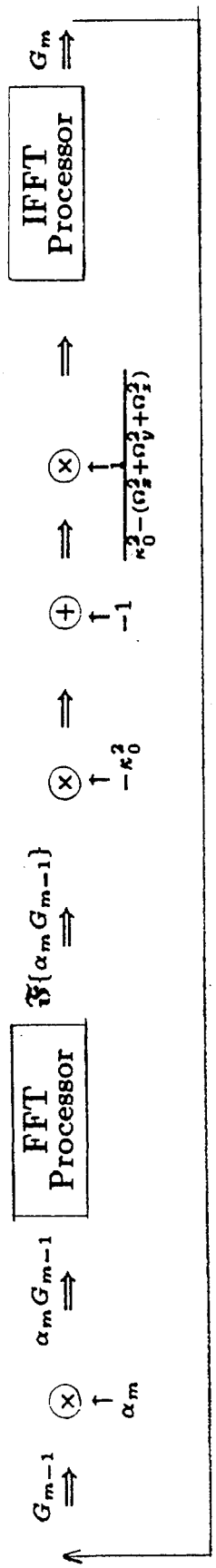
FIG. 1 is a block diagram of IDDM process.

Analysis of seismic or acoustic signals typically involves analysis of acoustic data elements by use of Helmholtz equations. The Helmholtz equation for media with arbitrary spatial variation of wave propagation speed, c, can be written in two dimensions as:

$$\Box^2 u(x,z) + k^2(x,x) \cdot u(x,x) = 0 \tag{59}$$

where, $$\kappa^2(x,z) = \frac{\omega^2}{c^2(x,z)} \tag{60}$$

Thus, the defining relation for the Green's function for the inhomogeneous media Helmholtz equation with a unit point source at the origin is:

$$\frac{\partial^2 G}{\partial x^2} + \frac{\partial^2 G}{\partial z^2} + \frac{\omega^2}{c^2(x,z)} G = \delta(x,z) \tag{61}$$

Expressing the reciprocal of the wave propagation speed as:

$$\frac{1}{c^2(x,z)} = \frac{1}{c_0^2} [1 + \alpha(x,z)] \tag{62}$$

the wave number squared, $k^2$, can be represented as:

$$\kappa^2(x,z) = \kappa_0^2[1 + \alpha(x,z)] \tag{63}$$

that is $k^2$ separated into constant and variable or perturbed parts. The Green's function relation (61) then becomes:

$$\frac{\partial^2 G}{\partial x^2} + \frac{\partial^2 G}{\partial z^2} + \kappa_0^2[1+\alpha(x,z)]G = -\delta(x,z) \tag{64}$$

Denoting the two-dimensional Fourier transform of G by g, that is:

$$\mathfrak{S}\{G(x,z)\} = g(\Omega_x, \Omega_z) \tag{46}$$

the two-dimensional Fourier transform of equation (64) is:

$$-(\Omega_x^2 + \Omega_z^2)g + k_0^2 g + k_0^2 \mathfrak{S}\{\alpha(x,z)\} \star g = -1 \tag{65}$$

where the operation represented by $\star$ means two-dimensional convolution. Moving the convolution term to the right-hand side and rearranging, results in:

$$[k_0^2 - (\Omega_x^2 + \Omega_z^2)]g = -1 - k_0^2 \mathfrak{S}\{\alpha(x,z)\} \star g \tag{66}$$

For $\alpha(x,z)=0$, or constant propagation speed media, define $g_0$ to be the solution to:

$$[k_0^2 - (\Omega_x^2 + \Omega_z^2)]g_0 = -1 \tag{67}$$

In other words, $g_0$, is just the Fourier transform of the solution to the constant media Helmholtz equation. When $\alpha(x,z)$ is "small", $\mathfrak{S}\alpha\{(x,z)\} \star g$ is also "small" so $$[k_0^2 - (\Omega_x^2 + \Omega_z^2)]g \cong -1 - k_0^2 \mathfrak{S}\{\alpha(x,z)\} \star g_0 \tag{68}$$

This suggests an iterative procedure. Defining $g_0$ as the solution to (67) and $g_1$ to be the solution to (68) or;

$$[k_0^2 - (\Omega_x^2 + \Omega_z^2)]g_1 = -1 - k_0^2 \star \{\alpha(x,z)\} \star g_0 \tag{69}$$

and further going on to define $g_n$ as the solution to:

$$[k_0^2 - (\Omega_x^2 + \Omega_z^2)] g_n = -1 - k_0^2 \mathfrak{S}\{\alpha(x,z)\} \star g_{n-1} \tag{70}$$

will lead to a good approximation for s if enough steps are taken, i.e., n sufficiently large, and $\alpha(x,z)$ is sufficiently small. For $\alpha(x,z)$ sufficiently small, $g_1$ would be close to $g_0$; $g_2$ would be even closer to $g_1$, and so forth till $g_n$ became almost identical to the previous iteration $g_{n-1}$. For $\alpha(x,z)$ "too" large, convergence is not obvious.

Defining a sequence of $\alpha$'s such that $\alpha_0=0$ and $\alpha_n=\alpha(x,z)$, say:

$$\alpha_m(x,z) = m\left[\frac{\alpha(x,z)}{n}\right] \forall\ m = 0, \ldots, n\ m, n \in \mathbb{Z}^+ \tag{71}$$

an iteration scheme can be devised for which when the $\alpha$'s are sufficiently close, the iterative solutions for the g's are also close. In fact, for at least a large class of problems, the simple method of revising the parameter $\alpha$ of (71) is adequate. Noting that:

$$\mathfrak{S}\{\alpha(x,z)\} \star g(\Omega_x,\Omega_z) = \star\{\alpha(x,z)\} \star \mathfrak{S}\{G(x,z)\} = \mathfrak{S}\{\alpha(x,z) \cdot G(x,z)\} \tag{72}$$

using equation (71), an improved iterative algorithm can be written as:

$$[\kappa_0^2 - (\Omega_x^2 + \Omega_z^2)]\, g_0 = -1 \tag{73}$$

$$[\kappa_0^2 - (\Omega_x^2 + \Omega_z^2)]\, g_1 = -1 - \kappa_0^2 \mathfrak{S}\{\alpha_1(x,z) \cdot G_0\} \tag{74}$$

$$[\kappa_0^2 - (\Omega_x^2 + \Omega_z^2)]\, g_2 = -1 - \kappa_0^2 \mathfrak{S}\{\alpha_2(x,z) \cdot G_1\} \tag{75}$$

$$[\kappa_0^2 - (\Omega_x^2 + \Omega_z^2)]\, g_m = -1 - \kappa_0^{2+L0} \mathfrak{S}\{\alpha_m(x,z) \cdot G_{m-1}\} \tag{76}$$

$$[\kappa_0^2 - (\Omega_x^2 + \Omega_z^2)]\, g_n = -1 - \kappa_0^2 \mathfrak{S}\{\alpha_n(x,z) \cdot G_{n-1}\} \tag{77}$$

If $\kappa_0 \in \mathbb{C}$ $$\kappa_0 = \kappa_R + j\kappa_I\ \kappa_R, \kappa_I \in \mathbb{C} \tag{78}$$

then the $k_0^2 - (\Omega_x^2 + \Omega_z^2)$ terms in equations (73–77) can never be zero if $k_I \neq 0$.

For $k_I \neq 0$ letting both the space and transform-space coordinates be real and discrete, and numerically approximating the Fourier transform $\mathfrak{S}$ by the Fast Fourier Transform $\mathcal{F}$, results in the following iterates for the Green's function of equation (61):

$$G_0 = \mathcal{F}^{-1}\left\{ \frac{-1}{\kappa_0^2 - (\Omega_x^2 + \Omega_z^2)} \right\} \tag{79}$$

$$G_1 = \mathcal{F}^{-1}\left\{ \frac{-1 - \kappa_0^2 \mathcal{F}\{\alpha_1 G_0\}}{\kappa_0^2 - (\Omega_x^2 + \Omega_z^2)} \right\} \tag{80}$$

$$G_m = \mathcal{F}^{-1}\left\{ \frac{-1 - \kappa_0^2 \mathcal{F}\{\alpha_m G_{m-1}\}}{\kappa_0^2 - (\Omega_x^2 + \Omega_z^2)} \right\} \tag{81}$$

$$G_n = \mathcal{F}^{-1}\left\{ \frac{-1 - \kappa_0^2 \mathcal{F}\{\alpha_n G_{n-1}\}}{\kappa_0^2 - (\Omega_x^2 + \Omega_z^2)} \right\} \tag{82}$$

The flow of the process is shown in FIG. 1. The choice of sign of $k_I$ affects the type of boundary conditions. Incoming wave boundary conditions result if $k_I$ is positive, $k_I$ negative yields outgoing or radiating wave conditions. Here, only iterates obeying outgoing wave boundary conditions are of present interest, so $k_I$ was given small negative (real) values only.

Examining equations (79–82), it is apparent that each iteration except the first (79) requires one forward Fast Fourier Transform $\mathcal{F}$, and one inverse Fast Fourier Transform $\mathcal{F}$. Since each iteration cycle used both the spatial x,z and the transformed $\Omega_x$, $\Omega_z$ coordinate domains, the name Iterative Dual Domain Method, or IDDM has been coined for the process.

The fast transforms used in the IDDM are subject to normal FFT considerations, as well as a few others related to media variations. One such additional consideration is the careful avoidance of aliasing. Each wavelength in the spatial x,z domain must be sampled at least twice. Thus, the slowest wave propagation speed regions, those with the largest positive $\alpha(x,z)$ values, should have no discontinuities across the wrap boundaries or errors will appear in the forward transform of the $\alpha G$ products. The examples in this disclosure do not have any discontinuities of $\alpha$ across wrap boundaries. This is not a severe restriction in practice since for an arbitrary $\alpha(x,z)$ these errors can be reduced to negligible values by expanding the grid and tapering at the edges. This is the same well-known problem, with well-known solutions, as the design of windowing functions for use with (perhaps multidimensional) digital filters.

$k_I$ should be chosen to be sufficiently negative so that the amplitudes of waves radiating across the wrap boundaries are sufficiently small. This is particularly important in the IDDM, since excessive energy crossing the wrap boundaries will result in divergence. This can become rather tricky for some configurations, such as waveguides, that focus or direct toward a wrap boundary. In practice, this problem can be overcome by increasing the spatial extent of the grid, particularly in the direction of the focused waves.

For grids of sufficiently large spatial extent and with $k_I$ sufficiently negative to allow the IDDM to converge, convergence was obtained after 30–45 iterations for all cases illustrated here and in all numerical experiments to date.

FOCUSING THROUGH A CIRCULAR LENS

Figure 2:
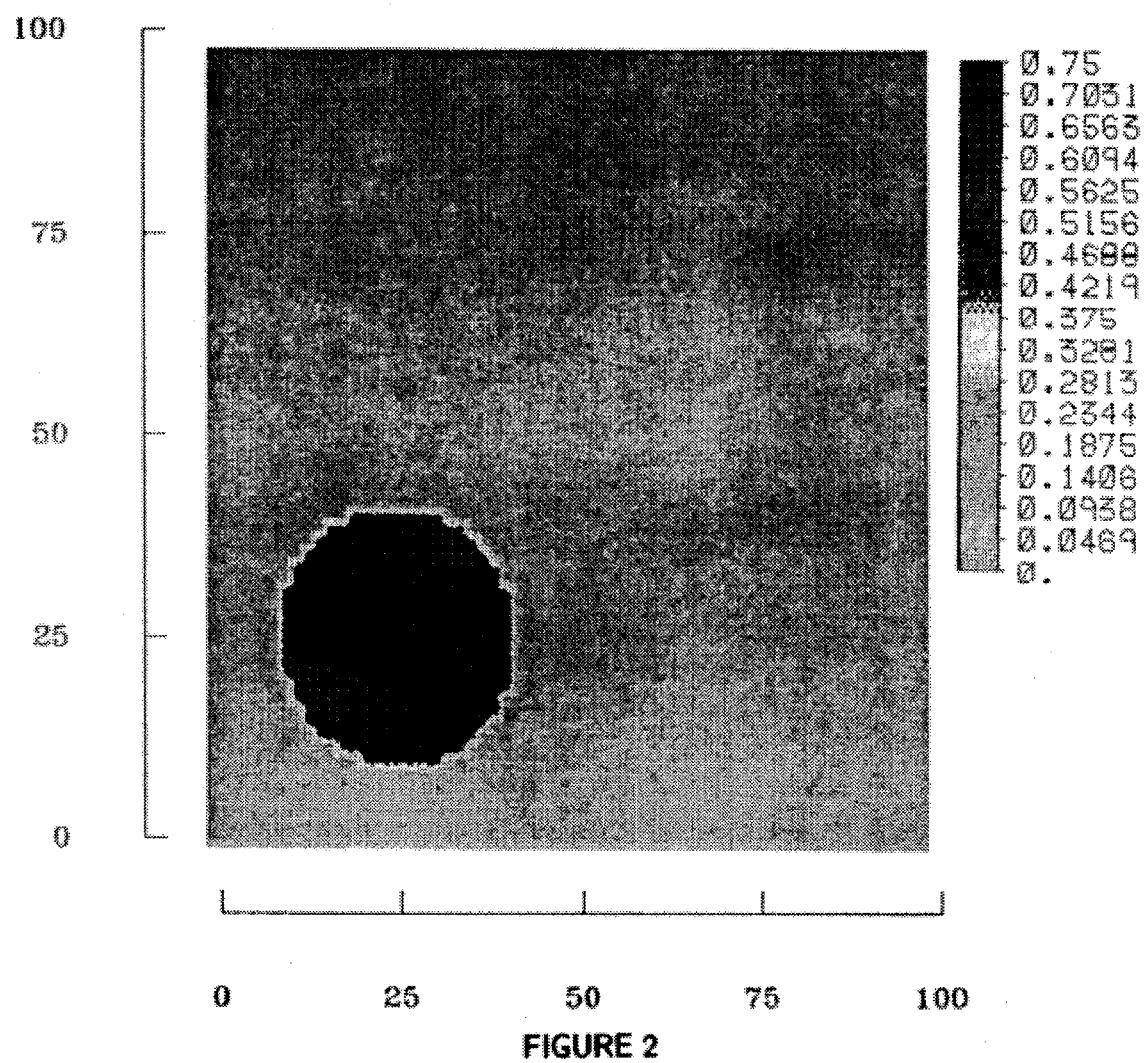
FIG. 2 is a variation of $\alpha$ in a medium, circle interior propagation velocity 76% of exterior.

FIG. 2 depicts the variation of media wave speed $\alpha(x,z)$ for a circle of radius 16 units with its center at (26,26). The interior of the circle has a value of $\alpha$ of 0.75, the exterior has $\alpha$ equal to zero. Thus, the interior of the circle has a wave propagation speed about 76% of the exterior value. The spatial extent of the $\alpha(x,z)$ used in the computation was $-100 \leq x \leq 100$ and $-100 \leq z \leq 100$. Only the first quadrant of a 128 by 128 point grid is shown in FIG. 2, the other quadrants all had $\alpha=0$. Note there are no discontinuities across wrap boundaries when $\alpha$ is arranged in wrap around order.

For very high frequencies where ray theory becomes valid, the focal length of this "thick circular lens" can be found from:

$$f = \frac{R(2-n_r)}{2(n_r-1)} \qquad (83)$$

where R is the radius of the circle and $n_r$ is the index of refraction. The particular geometry of FIG. 2 results in a focal length of about 16.8 units. In other words, waves of a sufficiently high frequency emanating from a point source 16.8 units away on one side of the circle would emerge as plane waves on the other side. A point source greater than the focal length away would give rise to waves that focused on the other side. The geometry of FIG. 2 has the circle about 20.8 distance units away from the point source at the origin. Thus, one would expect focusing phenomena to appear on the opposite side of the circular inhomogeneity at relatively high frequencies.

Figure 3:
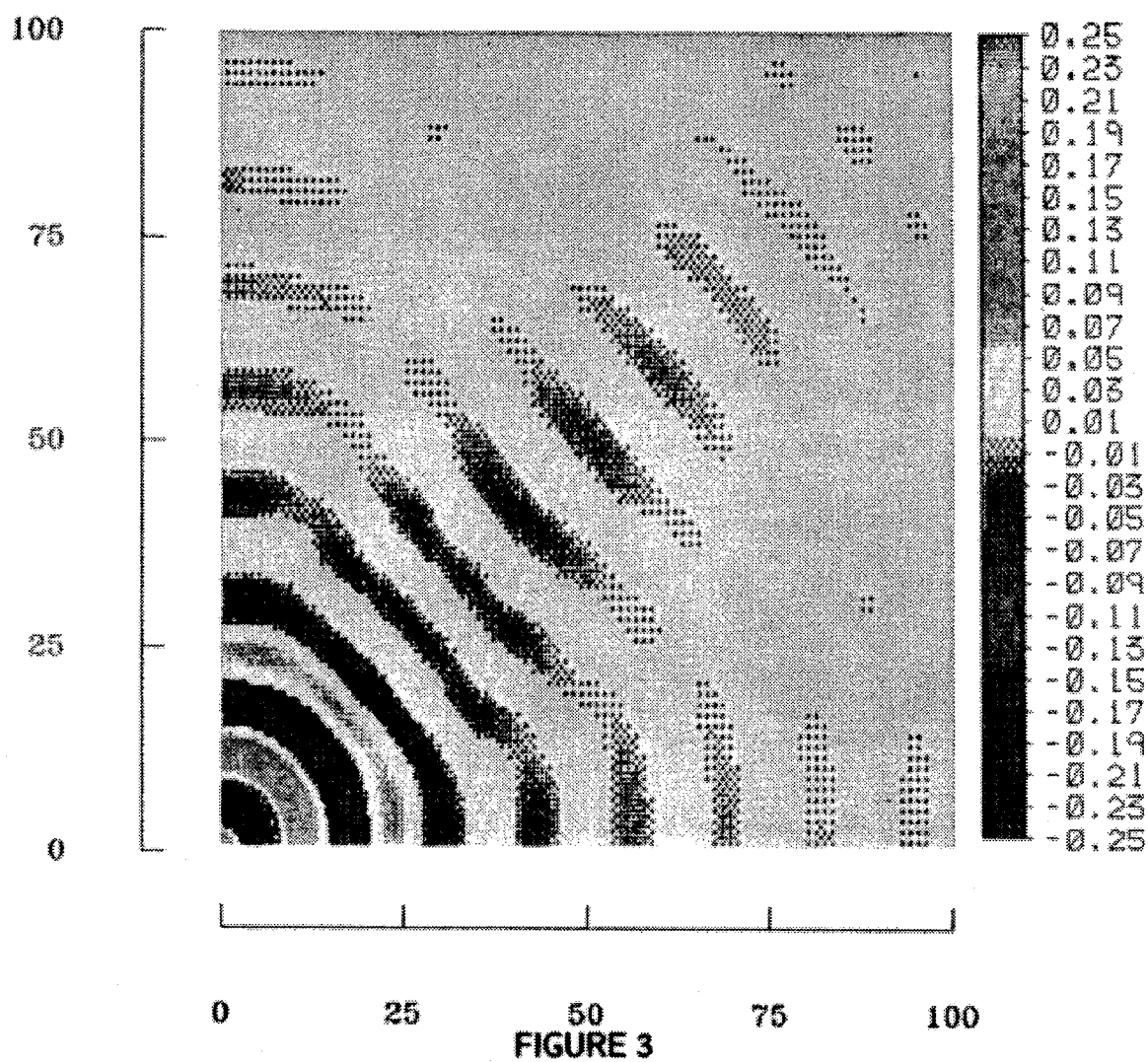
FIG. 3 is the focusing of Re(G) through circle with interior propagation velocity 76% of exterior, $k_0 = 0.5 - 0.032_j$.
Figure 4:
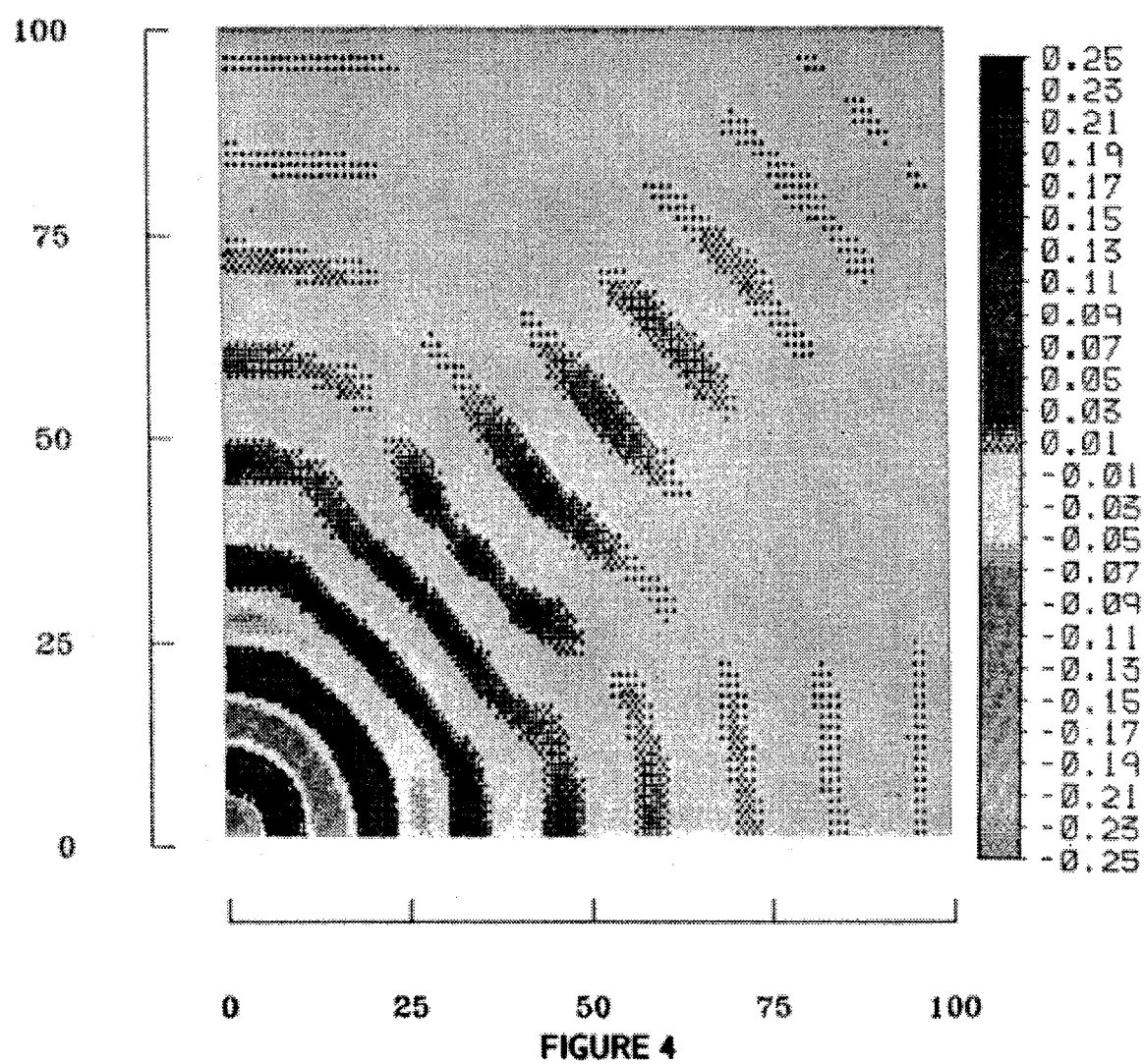
FIG. 4 is the focusing of Im(G) through circle with interior propagation velocity 76% of exterior, $k_0 = 0.5 - 0.03_j$.

The results of 45 iterations of the Iterative Dual Domain Method on a 128 by 128 point grid for the media inhomogeneity depicted in FIG. 2 are displayed as FIGS. 3 and 4 for $k_0=0.5-0.03_j$. FIG. 3 shows the real part of the numerical Green's function; the imaginary part is shown as FIG. 4. Both FIGS. 3 and 4 show the wavefronts "slowed down" by the circular inhomogeneity and the resulting focusing behind it. As was the case for Green's functions computed in homogeneous media, the singularity of the real part at the origin cannot be captured using inherently high frequency limited discrete Fourier transformations. At a frequency corresponding to $k_R=0.5$, the exterior of the circle is two times oversampled. Interior to the circle the propagation velocity is lower, the wavelength shorter, so it is only 1.52 times oversampled.

Figure 5:
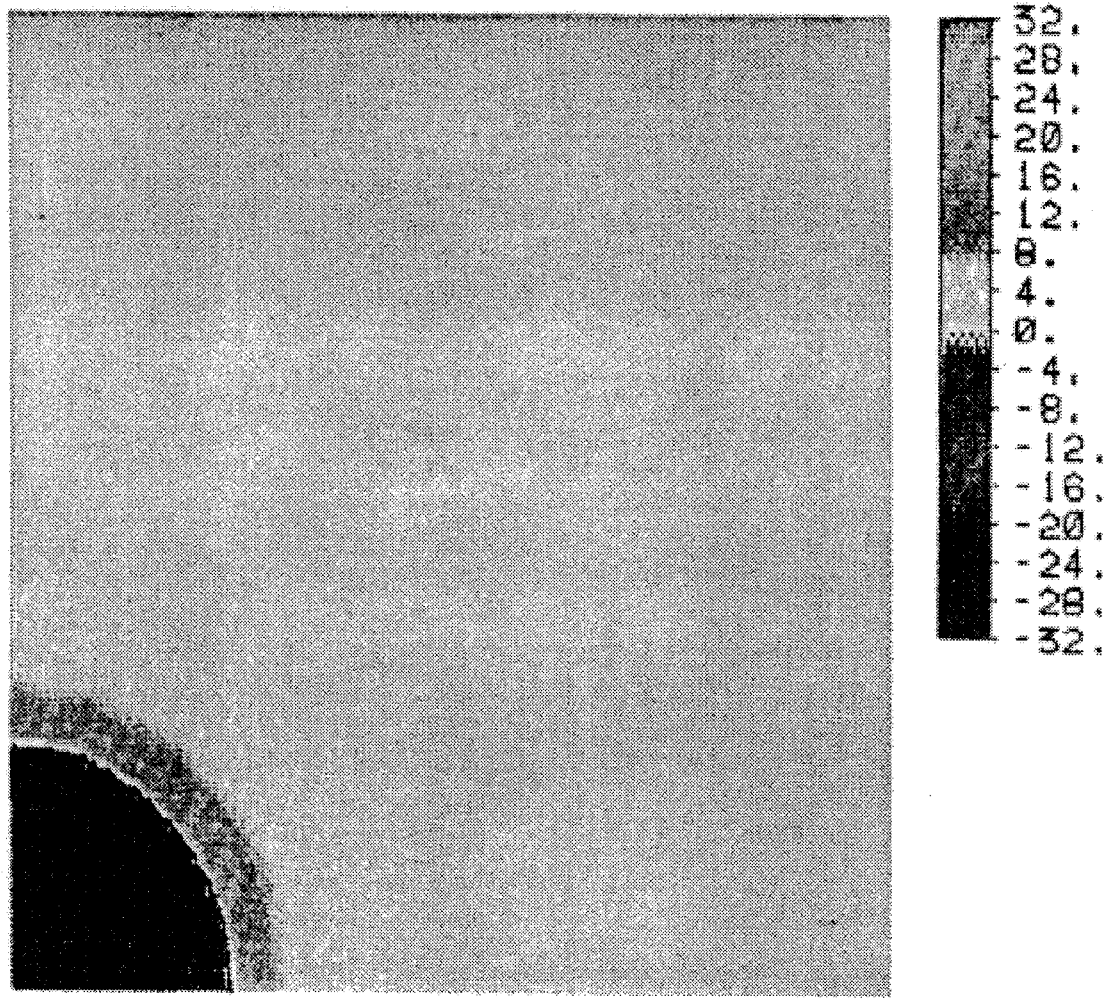
FIG. 5 is the first quadrant of Re $\mathcal{F}\{G\}$) for circle with interior propagation velocity 76% of exterior, $k_0 = 0.5 - 0.03_j$.
Figure 6:
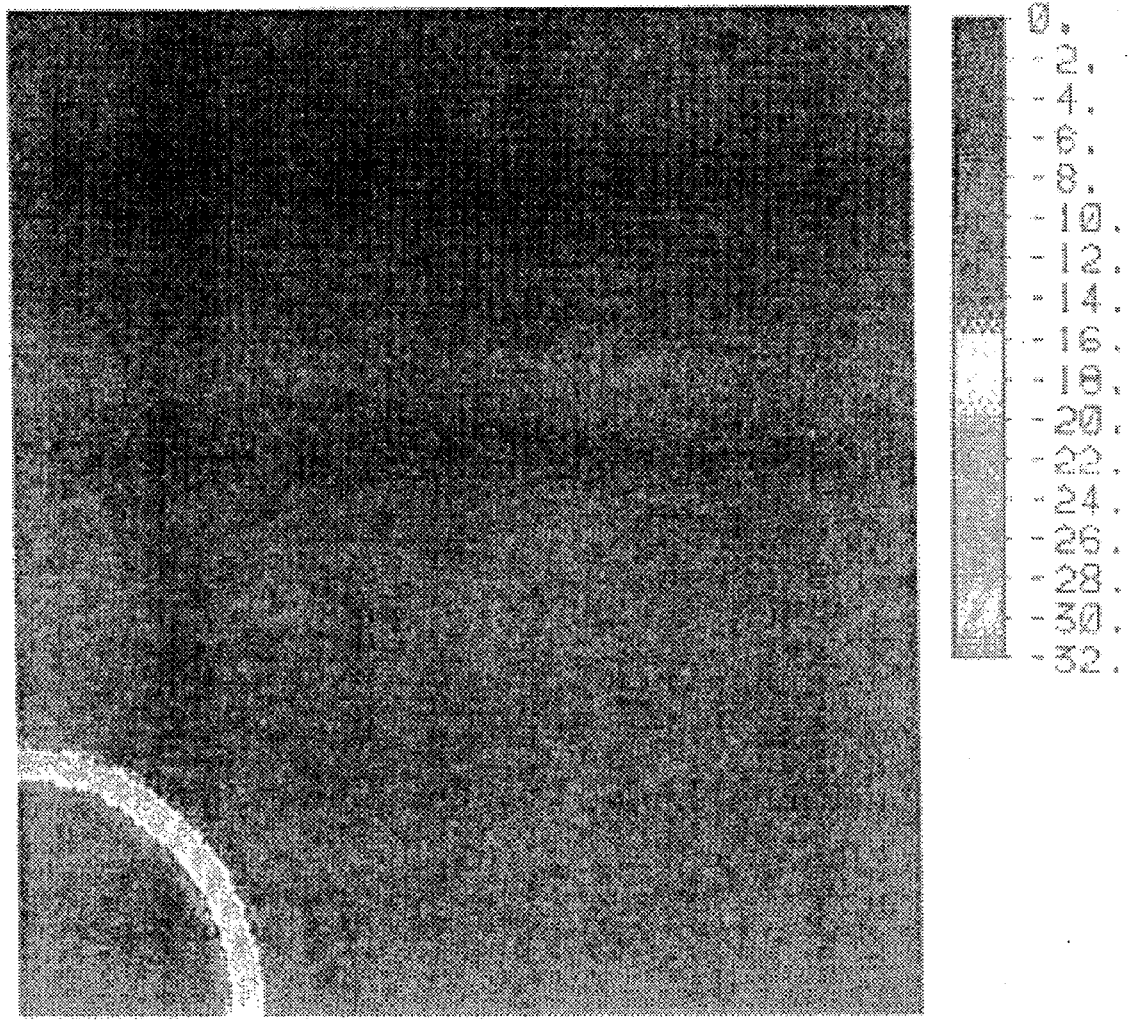
FIG. 6 is the first quadrant of Im $\mathcal{F}\{G\}$) for circle with interior propagation velocity 76% of exterior, $k_0 = 0.5 - 0.03_j$.
Figure 27:
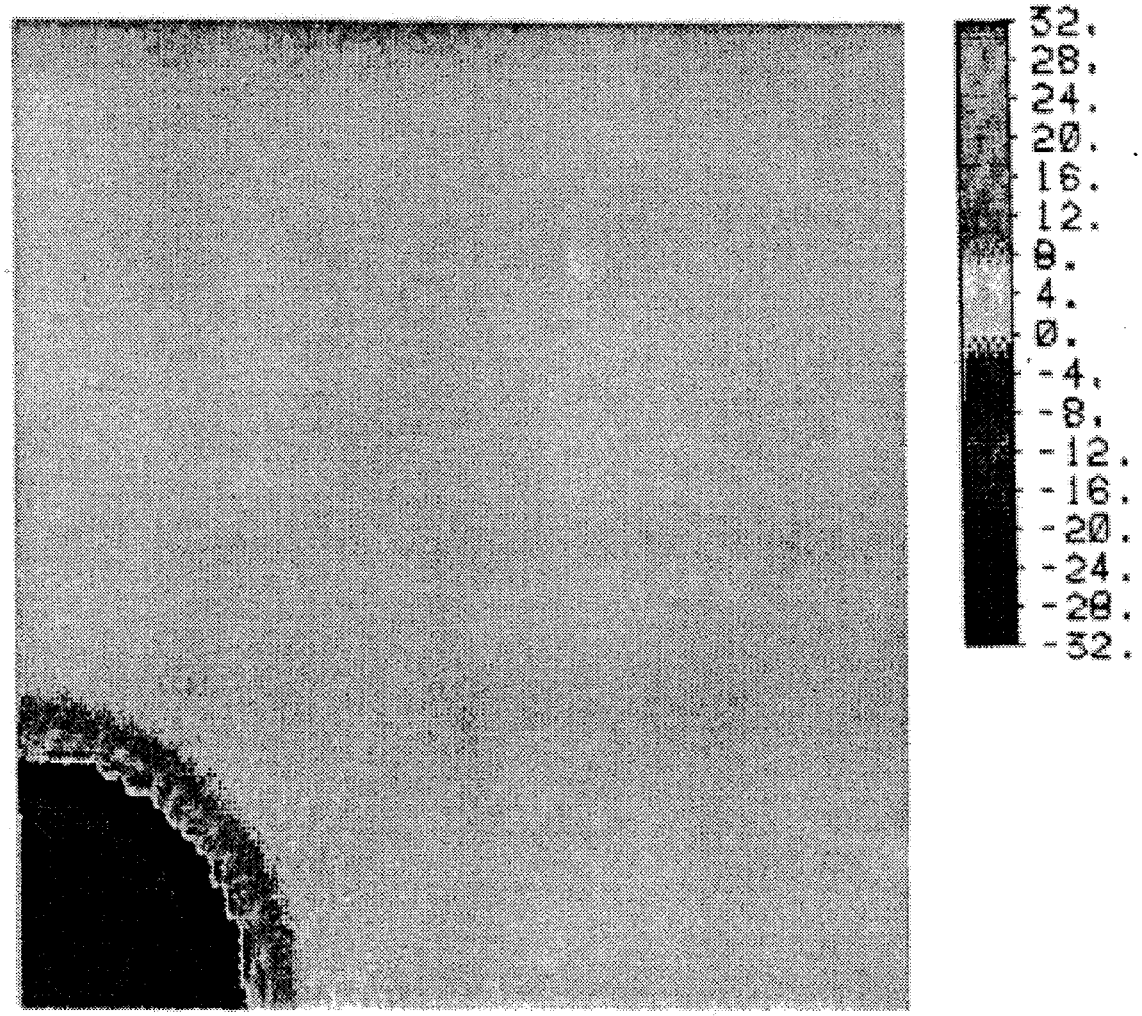
FIG. 27 is Re $\mathcal{F}\{G\}$) computed on a 128×128 grid, $k = 0.5 - 0.01_j$.
Figure 28:
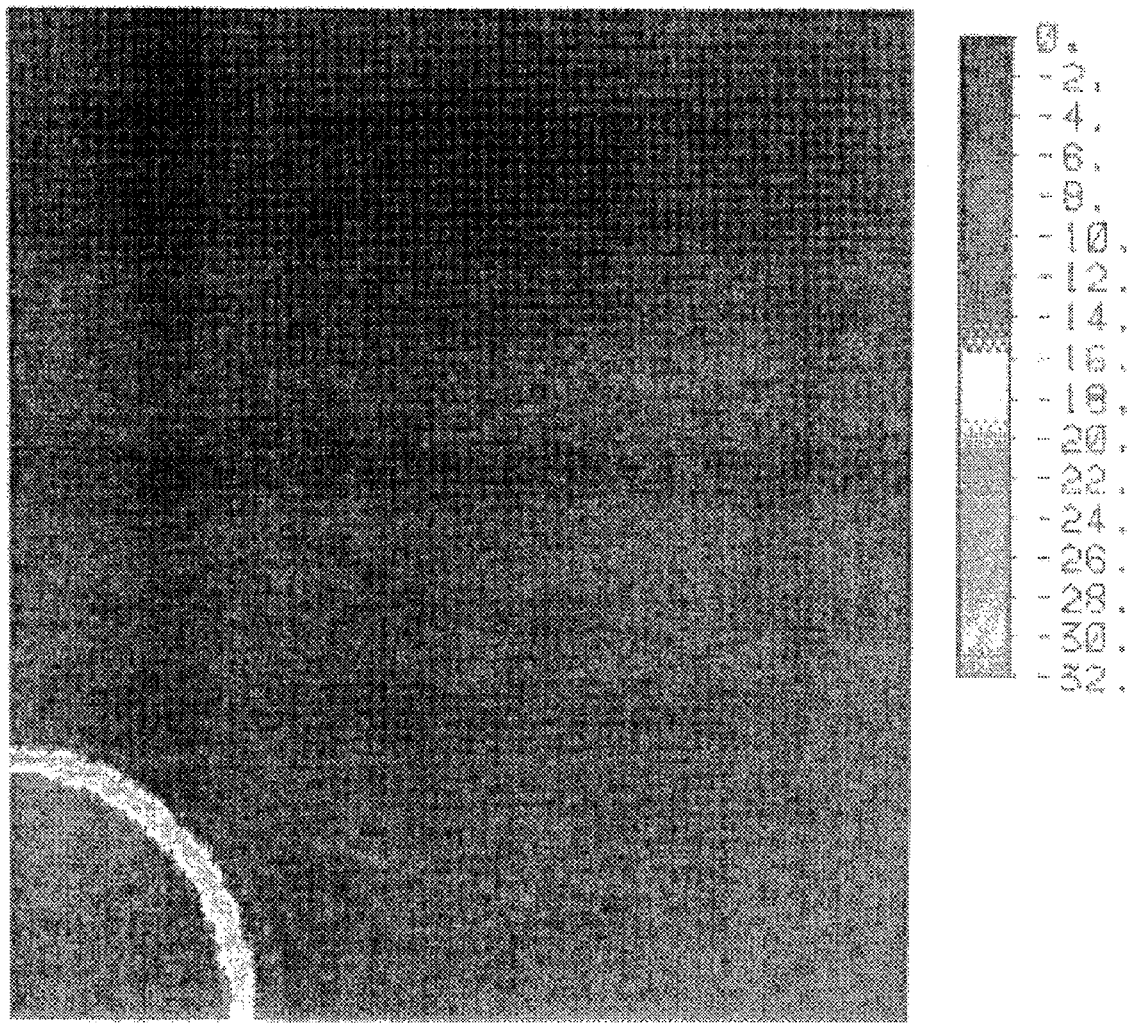
FIG. 28 is Im $\mathcal{F}\{G\}$) computed on a 128×128 grid, $k = 0.5 - 0.01^j$.

The Fourier transform of the results of FIGS. 3 and 4 are illustrated in part by FIGS. 5 and 6. These are the first quadrants of the real and imaginary parts of $g_n$ immediately prior to inverse transformation to yield $G_n$ of FIGS. 3 and 4. Despite the considerable differences between the results for inhomogeneous media, FIGS. 3 and 4, and homogeneous media, the transform domain results do not appear that much different. Comparing the inhomogeneous transform results, FIGS. 5 and 6, to their corresponding homogeneous transform results, FIGS. 27 and 28, one sees the inhomogeneous real part has a less pronounced "doublet ring" behavior, and the imaginary part has a wider "halo" around its "delta function ring". This indicates that the behavior of the transformed Green's functions may not be at all intuitive.

Figure 7:
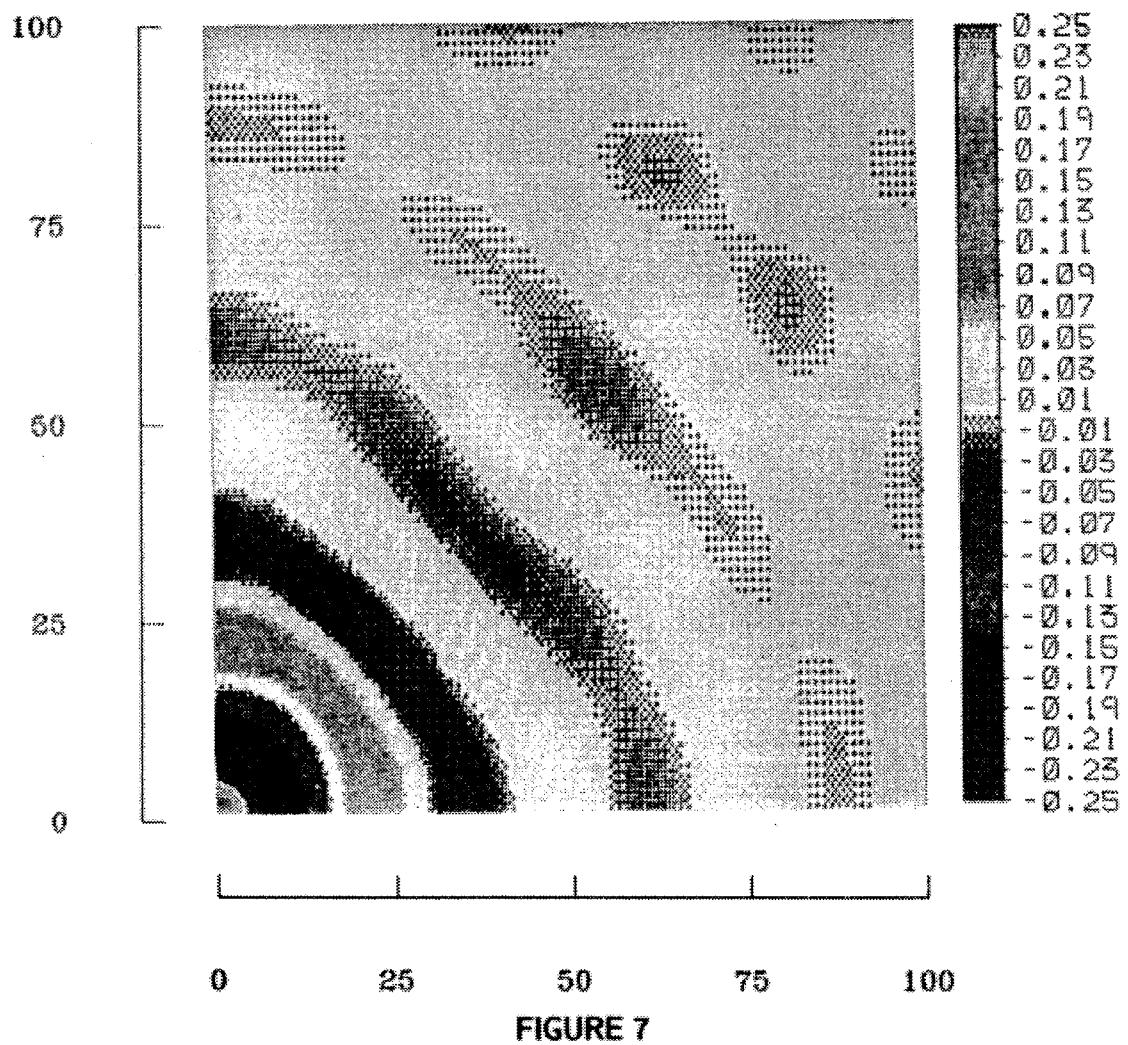
FIG. 7 is less focusing and greater diffraction at lower frequencies, $k_0 = 0.25 - 0.03_j$, Re(G) through circle with interior propagation velocity 76% of exterior.
Figure 8:
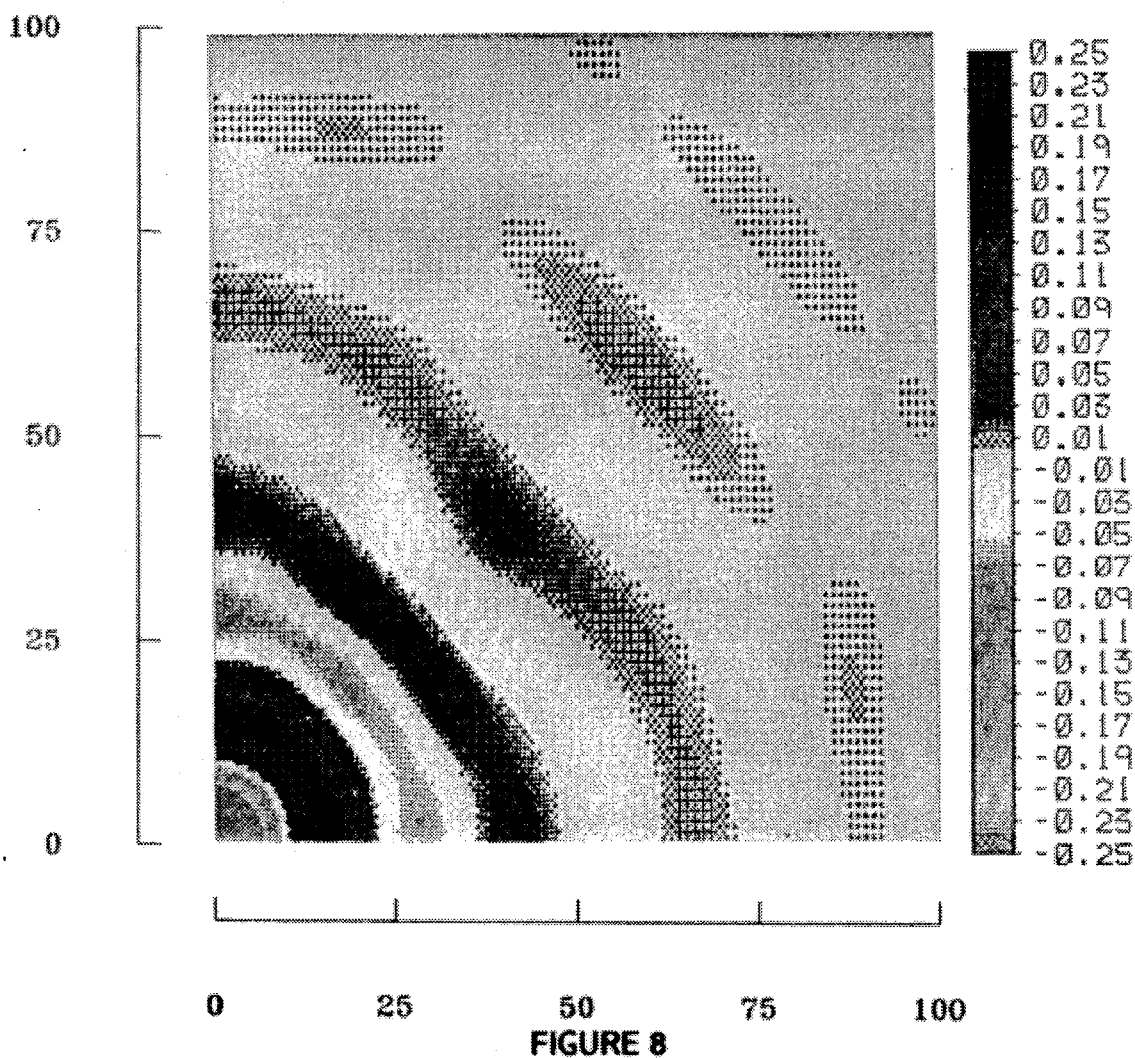
FIG. 8 is less focusing and greater diffraction at lower frequencies, $k_0 = 0.25 - 0.03_j$, Im(G) through circle with interior propagation velocity 76% of exterior.

FIGS. 7 and 8 illustrate the Green's function for the media variation of FIG. 2, at half the frequency of FIGS. 3–6. For $k_0=0.25-0.03_j$ the circular inhomogeneity causes much less focusing with the wavefronts more readily diffracting around it. Since the frequency is half, the results of FIGS. 7 and 8 have twice oversampling of FIGS. 3 and 4. The region outside the circle is oversampled four times, the interior three times. As a consequence, each wavefront shows relatively more detail.

SCATTERING BY A HIGHER SPEED CIRCULAR INCLUSION

Figure 9:
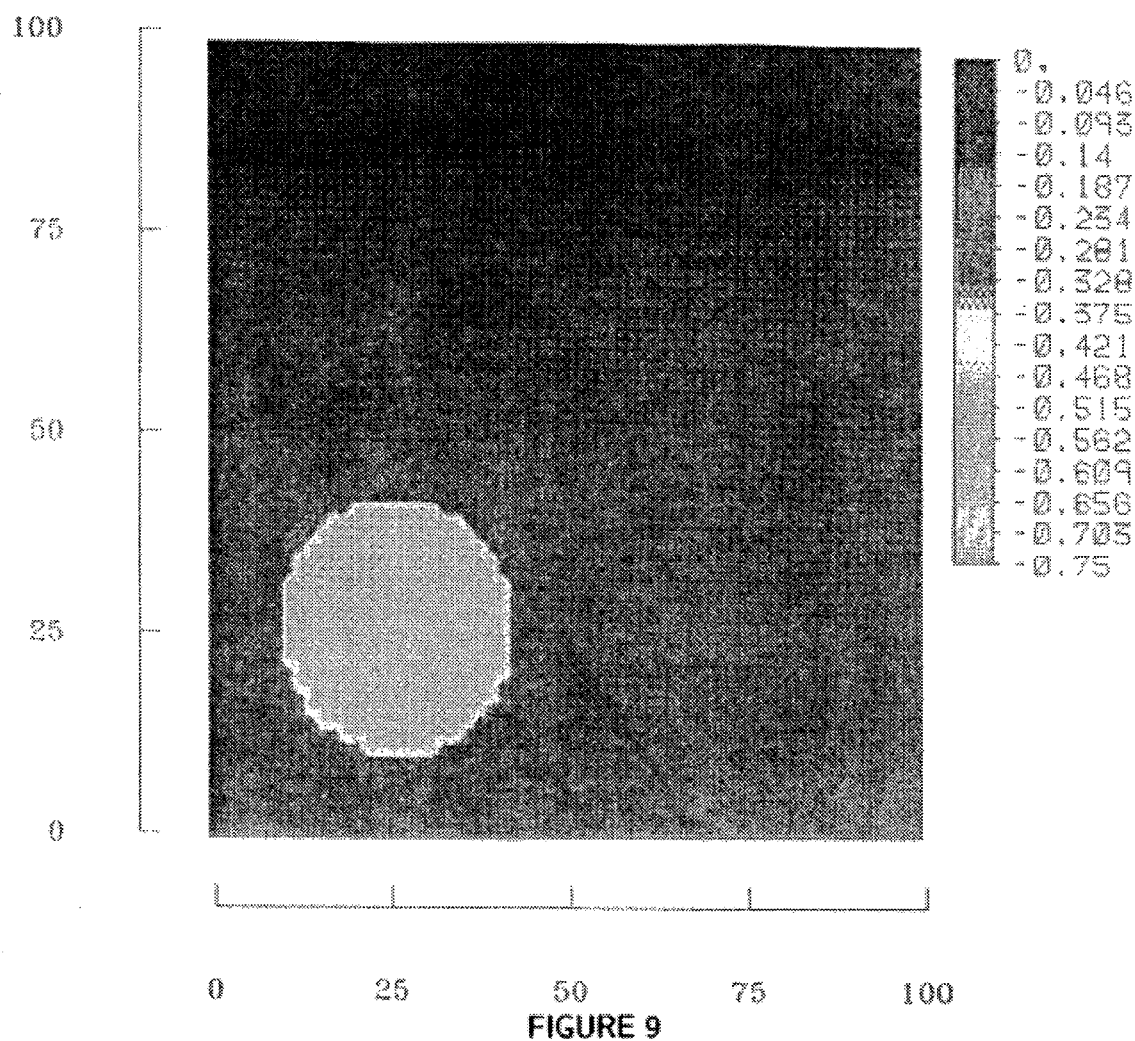
FIG. 9 is a variation of $\alpha$ in a medium, circle interior propagation velocity 200% of exterior.

Similar to the geometry of the previous section, FIG. 9 depicts another variation of media wave speed $\alpha(x,z)$ for a circle of radius 16 units with its center at (26,26). The interior of the circle has a value of $\alpha=-0.75$, the exterior has $\alpha$ equal to zero. Thus, the interior of the circle has a wave propagation speed 200% of the exterior value. As in the previous section, the spatial extent of $\alpha(x,z)$ used in computations was $-100 \leq x \leq 100$ and $-100 \leq z \leq 100$, with only the first quadrant of the 128 by 128 point grid shown in FIG. 9.

When a wave impinges on such a relatively large, smooth solid inhomogeneity, the inhomogeneity reacts to the incoming wave in a multitude of ways. First, the wave can generate a specularly reflected echo from the front of the inhomogeneity. The wave can further enter the circular inhomogeneity of FIG. 9 and be reflected from the back side to produce a secondary echo. Also diffracted or "creeping" waves originate on the edge of the geometrical shadow and travel around the circle with the wave propagation speed of the exterior media. Compounding the complexity, the inhomogeneity may oscillate internally in the neighborhood of one or more resonant frequencies, giving rise to "resonant scattering". Finally, all these wave phenomena reradiate in various directions as they travel in and around the inhomogeneity. For a circular inhomogeneity such as that of FIG. 9 for $k_R R>2$, where R is the radius of the circle, one would expect forward scattering and reradiation from the circle to occur. Further, the forward scattering should be less than that for a perfectly rigid inhomogeneity.

Figure 10:
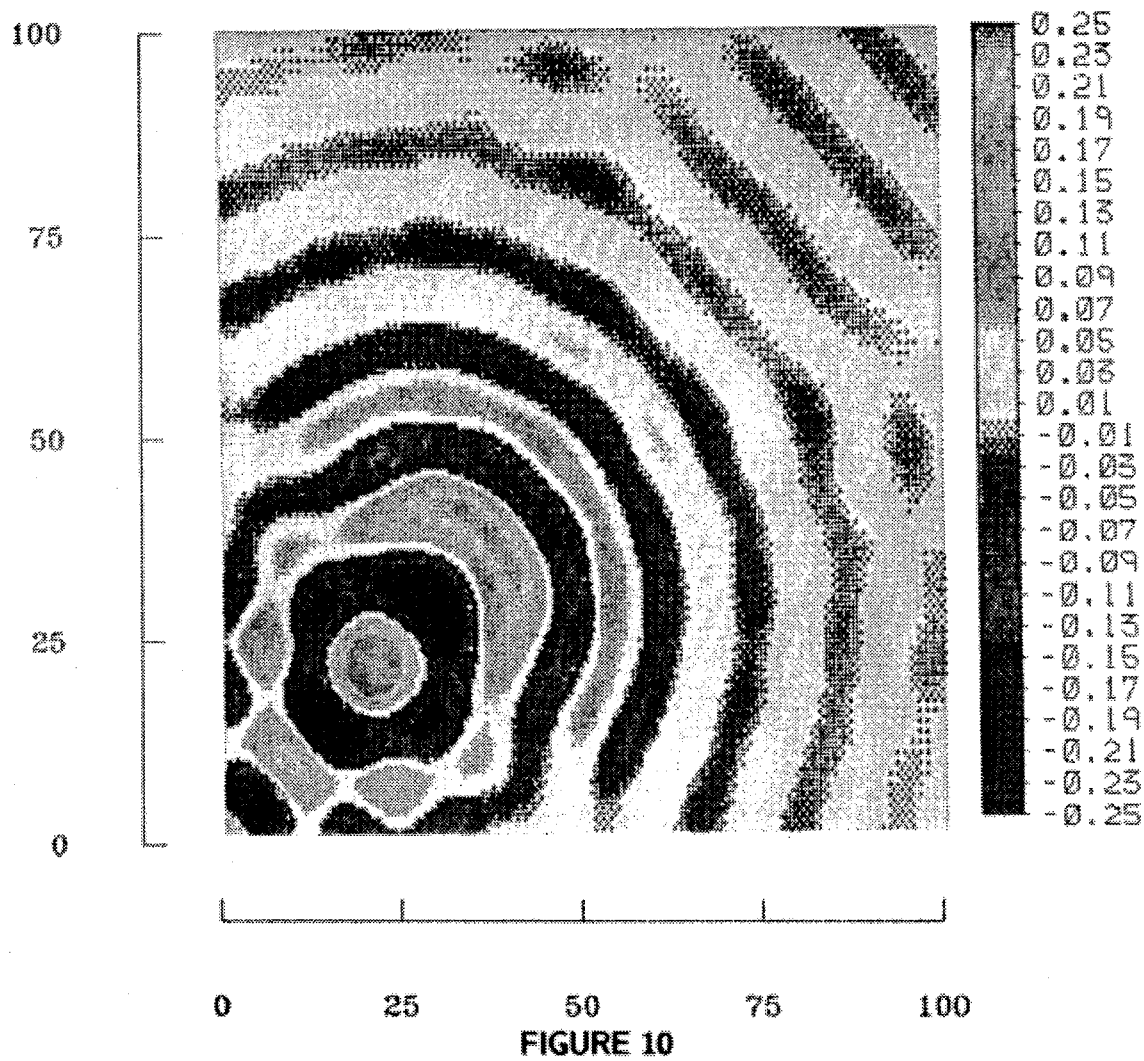
FIG. 10 is the scattering of Re(G), circle with interior propagation velocity 200% of exterior, $k_0 = 0.5 - 0.03_j$.
Figure 11:
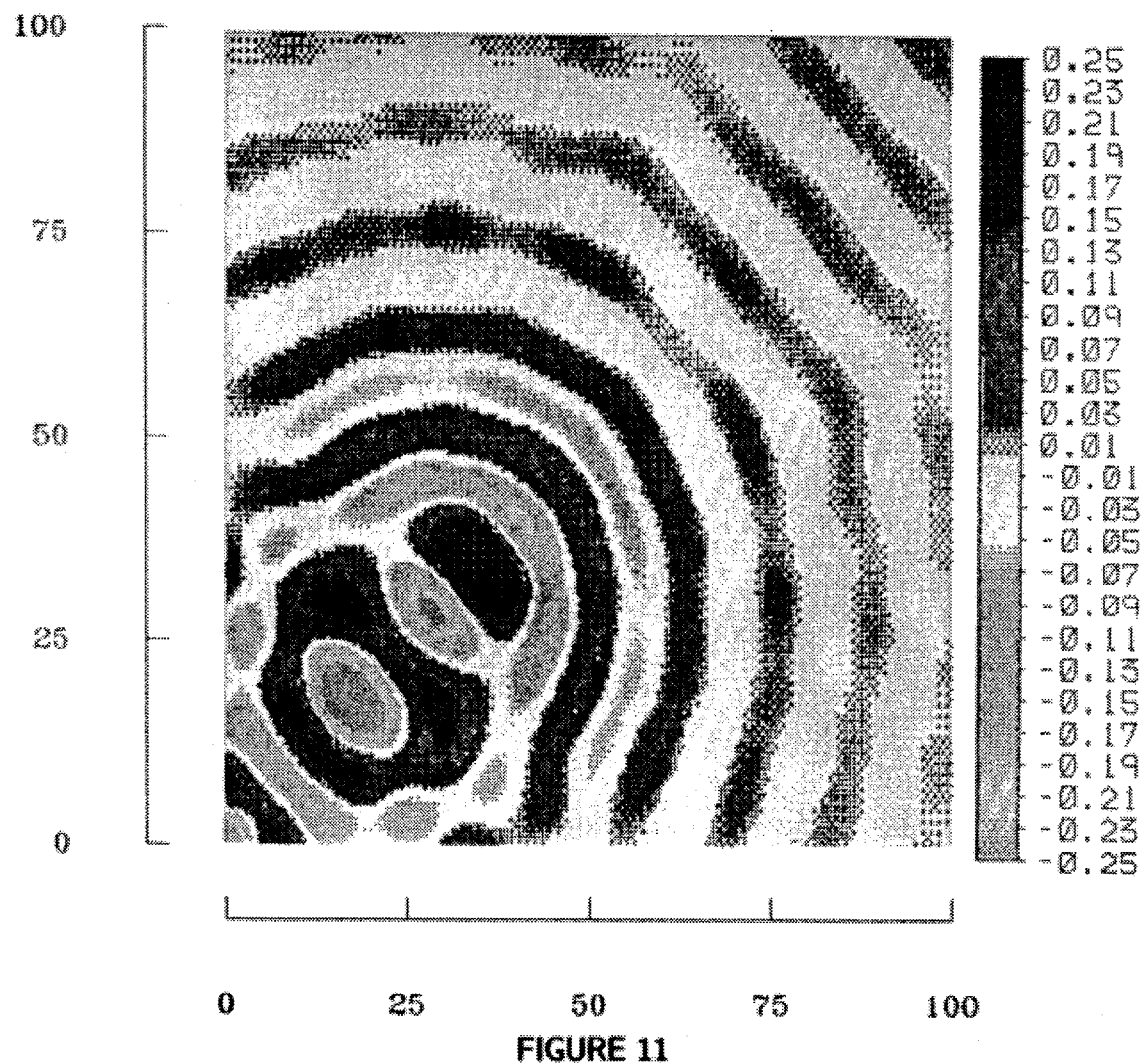
FIG. 11 is the scattering of Im(G), circle with interior propagation velocity 200% of exterior, $k_0 = 0.5 - 0.03_j$.

The results of 45 iterations of the IDDM on a 128 by 128 point grid for the media inhomogeneity depicted in FIG. 9 are displayed as FIGS. 10 and 11 for $k_0=0.50-03_j$. FIG. 10 shows the real part of the numerical Green's function; the imaginary part is shown as FIG. 11. Both FIGS. 10 and 11 show the extraordinarily complex wave field inside the circular inhomogeneity and the reradiation of energy from it. The region between the point source at the origin and the near surface of the circular inhomogeneity clear shows the echo or backscatter from this surface.

Figure 29:
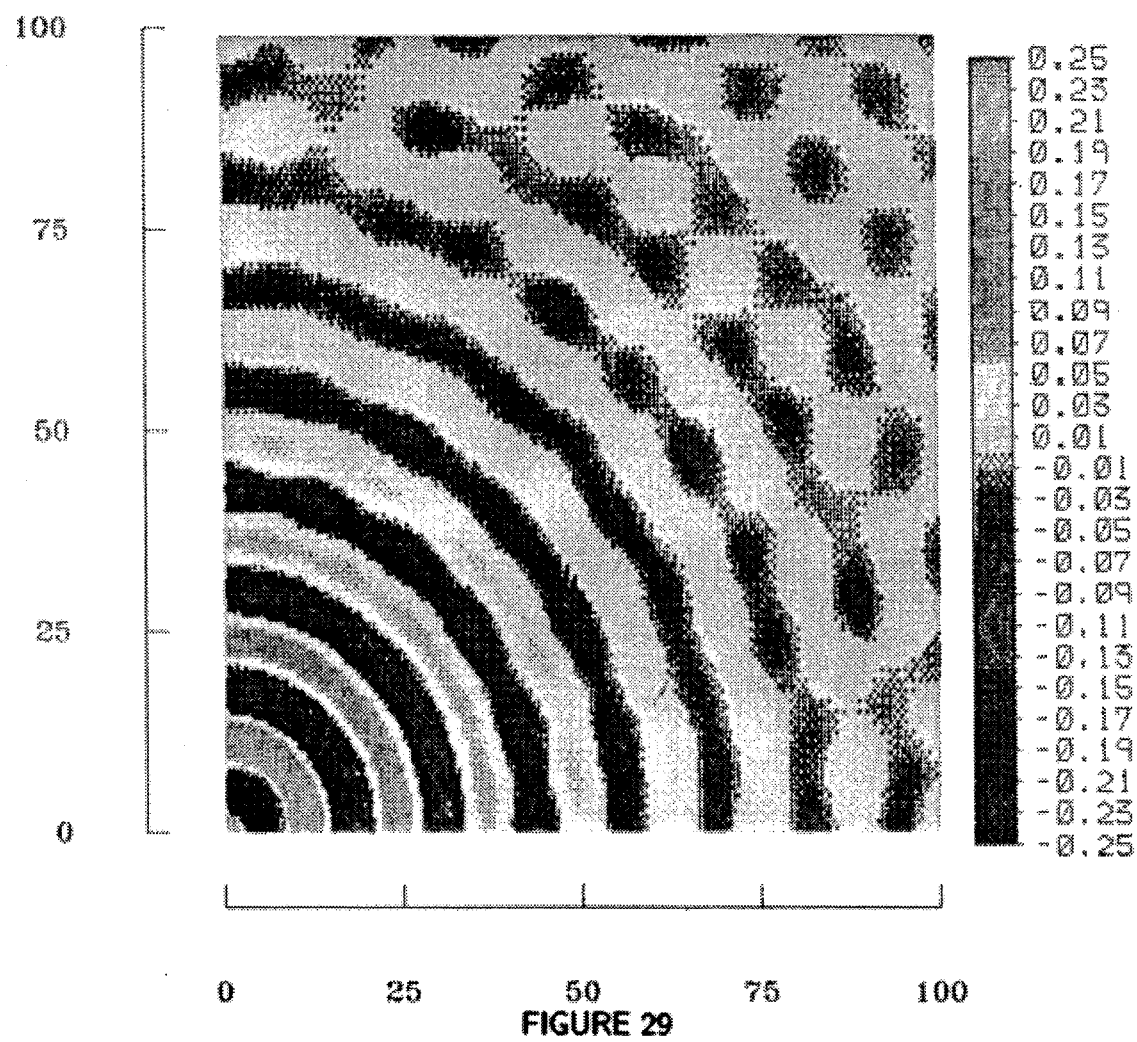
FIG. 29 is Re(G) found by IFFT on a 128×128 grid, $k = 0.5 - 0.01_j$.
Figure 30:
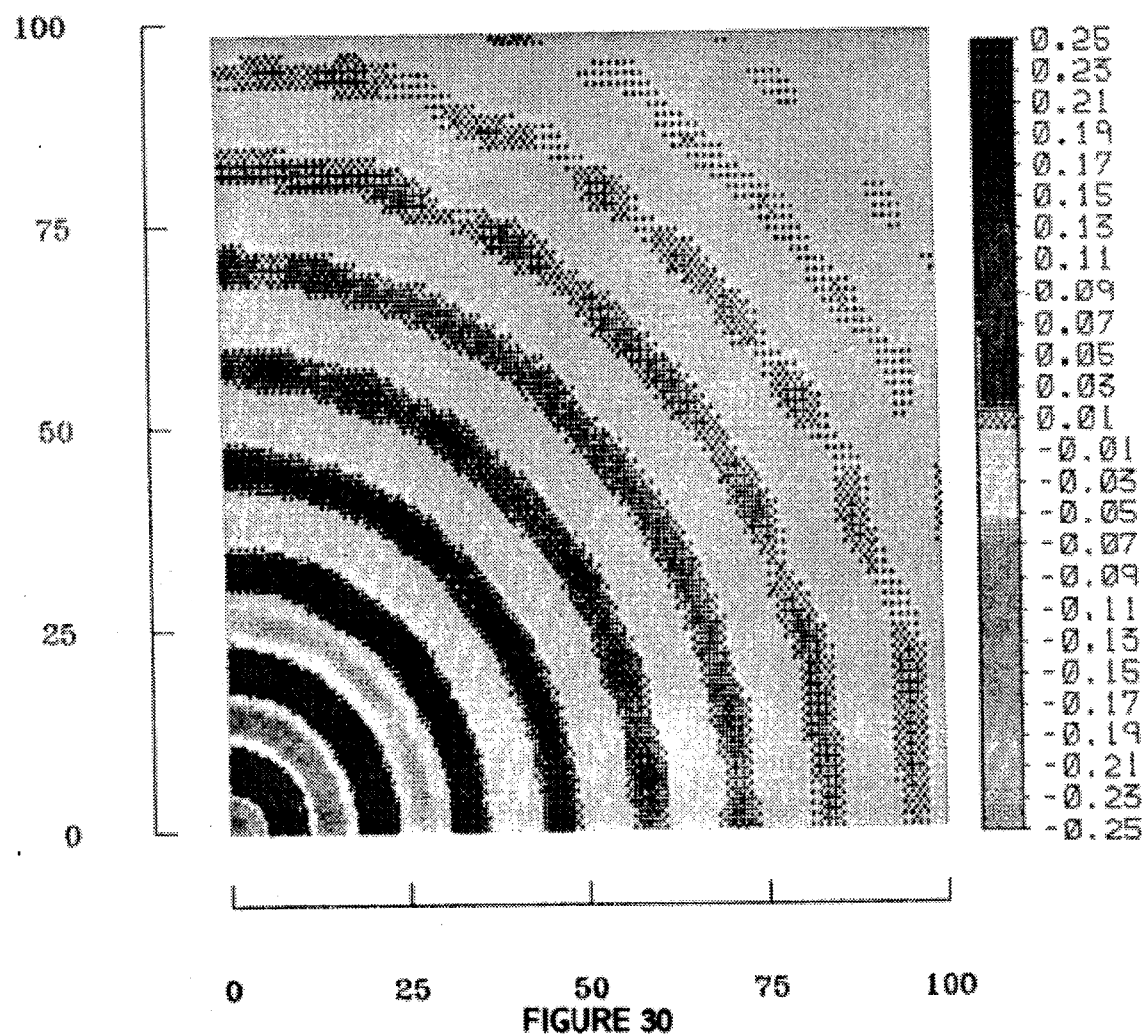
FIG. 30 is Ira(G) found by IFFT on a 128×128 grid, $k = 0.5 - 0.01_j$.

For the configuration of FIG. 9 at $k_0=0.5-0.03_j$, with respect to the exterior media $k_R R=8$. With respect to the interior media $k_R R=4$. Since the medium velocity contrast is not as great as it would be for a rigid circular inclusion, the forward radiation pattern of FIGS. 10 and 11 should not as be severe. In fact, this is the case. On the other hand, the forward radiation pattern should be more pronounced for the present case of double the wave speed interior to the circular inclusion than that for $k_R R=4$ where the wave speed variation was 140%. The mean forward scattering coefficient indicates the wave amplitudes immediately forward of the circular inclusion should be about double of what they would have otherwise had been in the absence of the inclusion. Comparing; the wave magnitudes at this location in FIGS. 10 and 11 to those for the homogeneous media, FIGS. 29 and 30, one observes this is indeed the case. These comparisons have been made to scattering of an incident plane wave, not a point source, so the quantitative behavior of the solutions shown in FIGS. 10 and 11 is only approximately verified. Also, the results of FIGS. 10 and 11 are for a complex $k_0=0.5-0.03_j$, with a relatively high damping value of $k_j=-0.03$, whereas the previously published results are for negligible damping. However, the qualitative behavior is correct and the quantitative results are quite reasonable.

Figure 12:
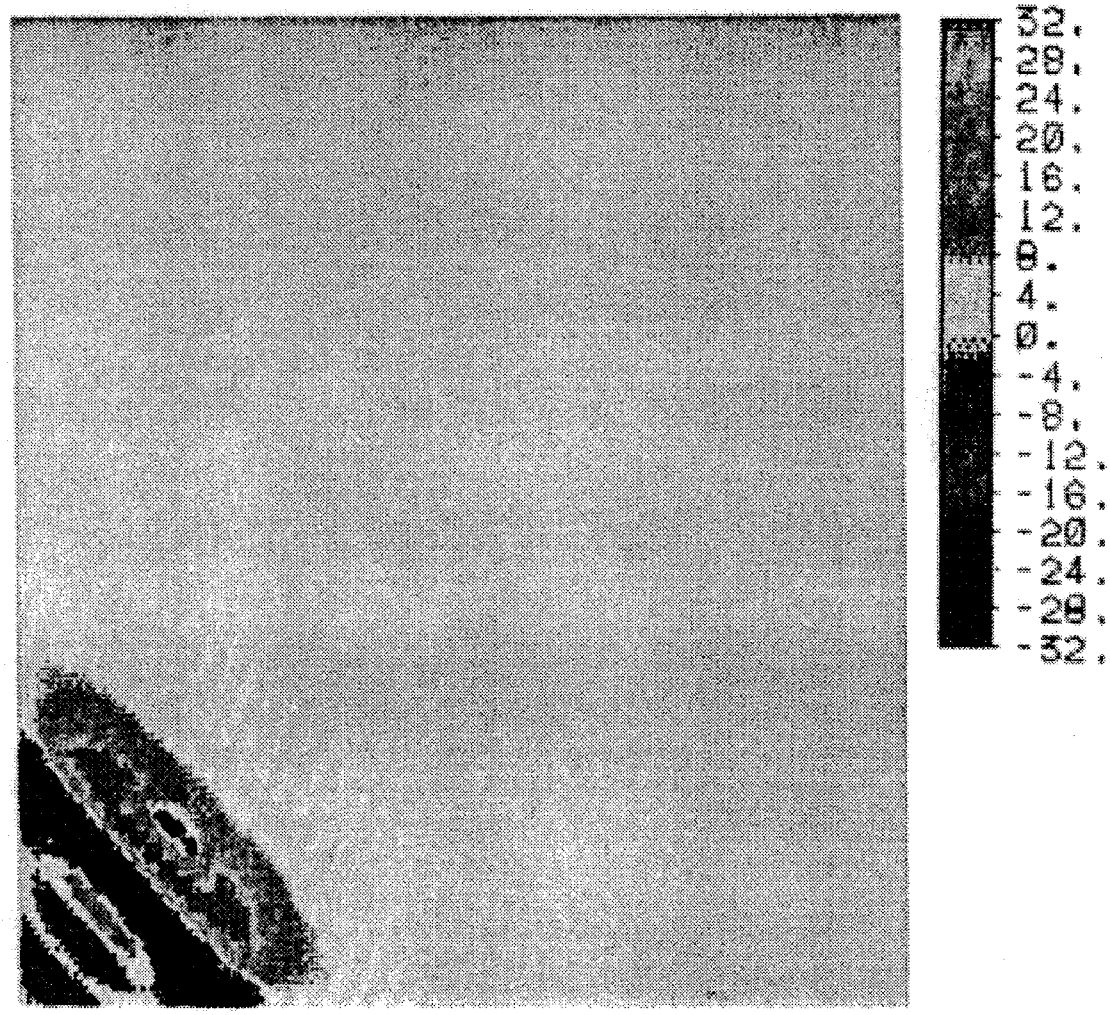
FIG. 12 is the first quadrant of Re $\mathcal{F}\{G\}$) for circle with interior propagation velocity 200% of exterior, $k_0 = 0.5 - 0.03_j$.
Figure 13:
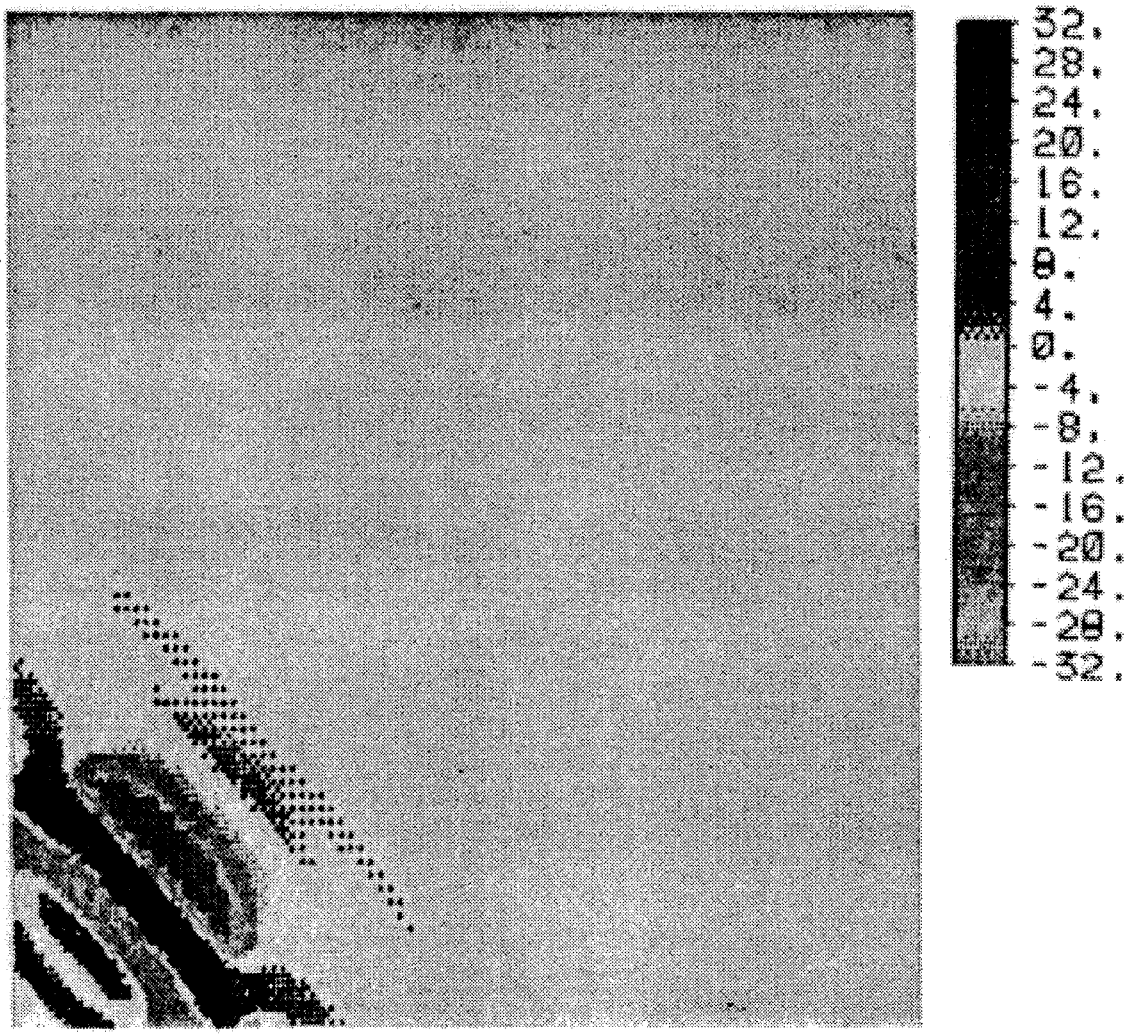
FIG. 13 is the first quadrant of Im $\mathcal{F}\{G\}$) for circle with interior propagation velocity 200% of exterior, $k_0 = 0.5 - 0.03_j$.

The Fourier transform of the results of FIGS. 10 and 11 are illustrated in part by FIGS. 12 and 13. These are the first quadrants of the real and imaginary parts of $g_n$. FIGS. 12 and 13 are radically different in appearance than any other previously displayed transform domain results. This demonstrates the IDDM iterations for the g's in transform space can converge to solutions much different than their starting values. Although the pictures of FIGS. 12 and 13 are hardly intuitive in their meaning, they do make some sense. Note the high amplitude "ridge" of both the real and imaginary parts of $g_n$, FIGS. 12 and 13, respectively. The direction or orientation of this ridge in $\Omega_x$, $\Omega_z$, space is perpendicular to the axis of high amplitudes in untransformed x,z space. This is consistent with the properties of two-dimensional Fourier transforms.

Figure 14:
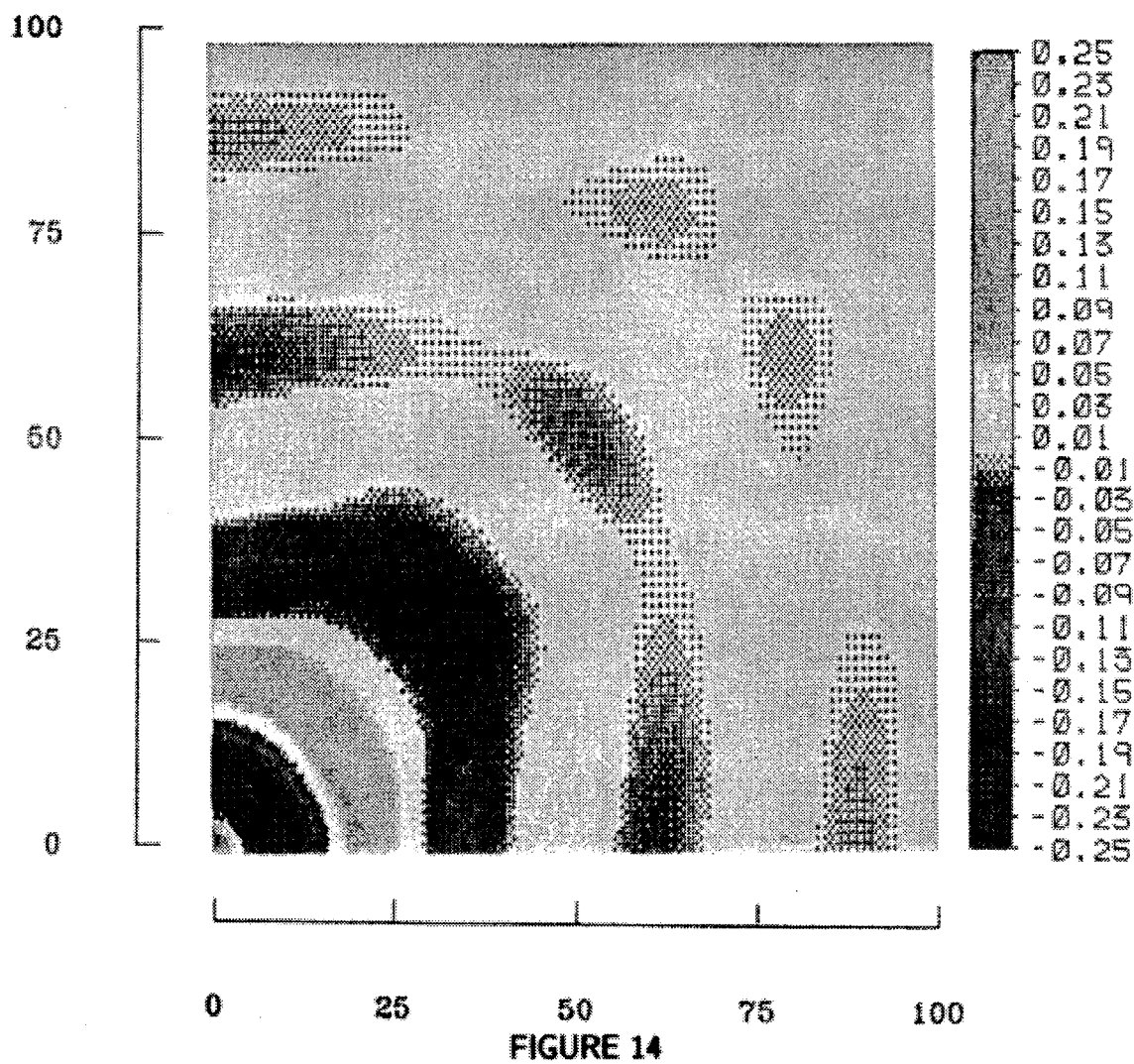
FIG. 14 is the diffraction of lower frequencies, $k_0 = 0.25 - 0.03_j$, Re(G) through circle with interior propagation velocity 200% of exterior.
Figure 15:
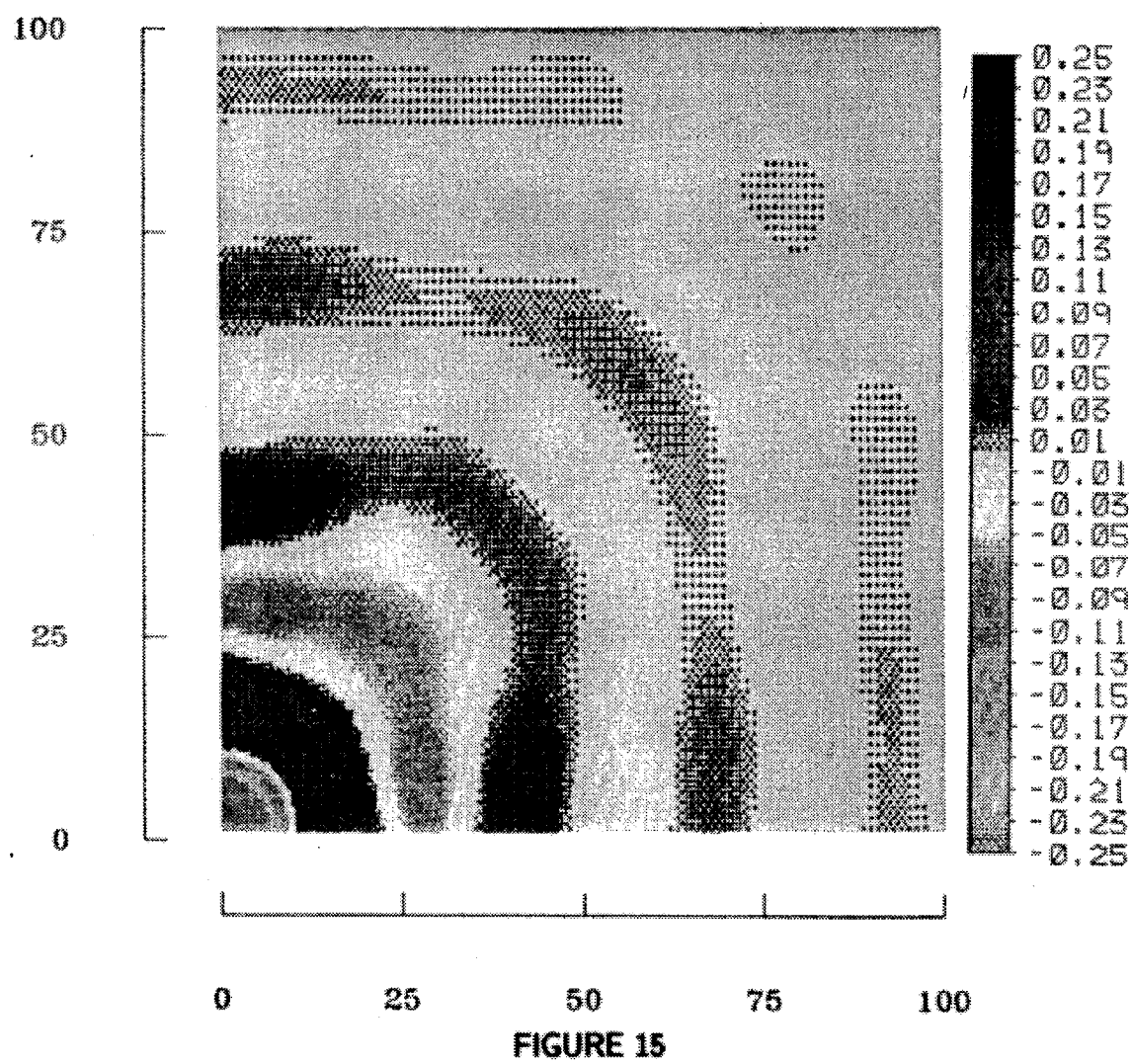
FIG. 15 is the diffraction of lower frequencies, $k_0 = 0.25 - 0.03_j$, Im(G) through circle with interior propagation velocity 200% of exterior.

FIGS. 14 and 15 display the Green—s function for the media variation of FIG. 9, at half the frequency of FIGS. 10–13. For $k_0=0.25-0.03_j$, the higher speed circular inhomogeneity causes much less scattering with the wavefronts more readily diffracted around it. Comparison to published scattering results indicates the forward radiation pattern, now much less dramatic than the high frequency case, has the correct shape. The faster propagation of the wavefronts and the corresponding stretching of the wavelengths through the circular inhomogeneity are apparent in both the real and imaginary parts, FIGS. 14 and 15, respectively.

WAVES IN LAYERED MEDIA

Figure 16:
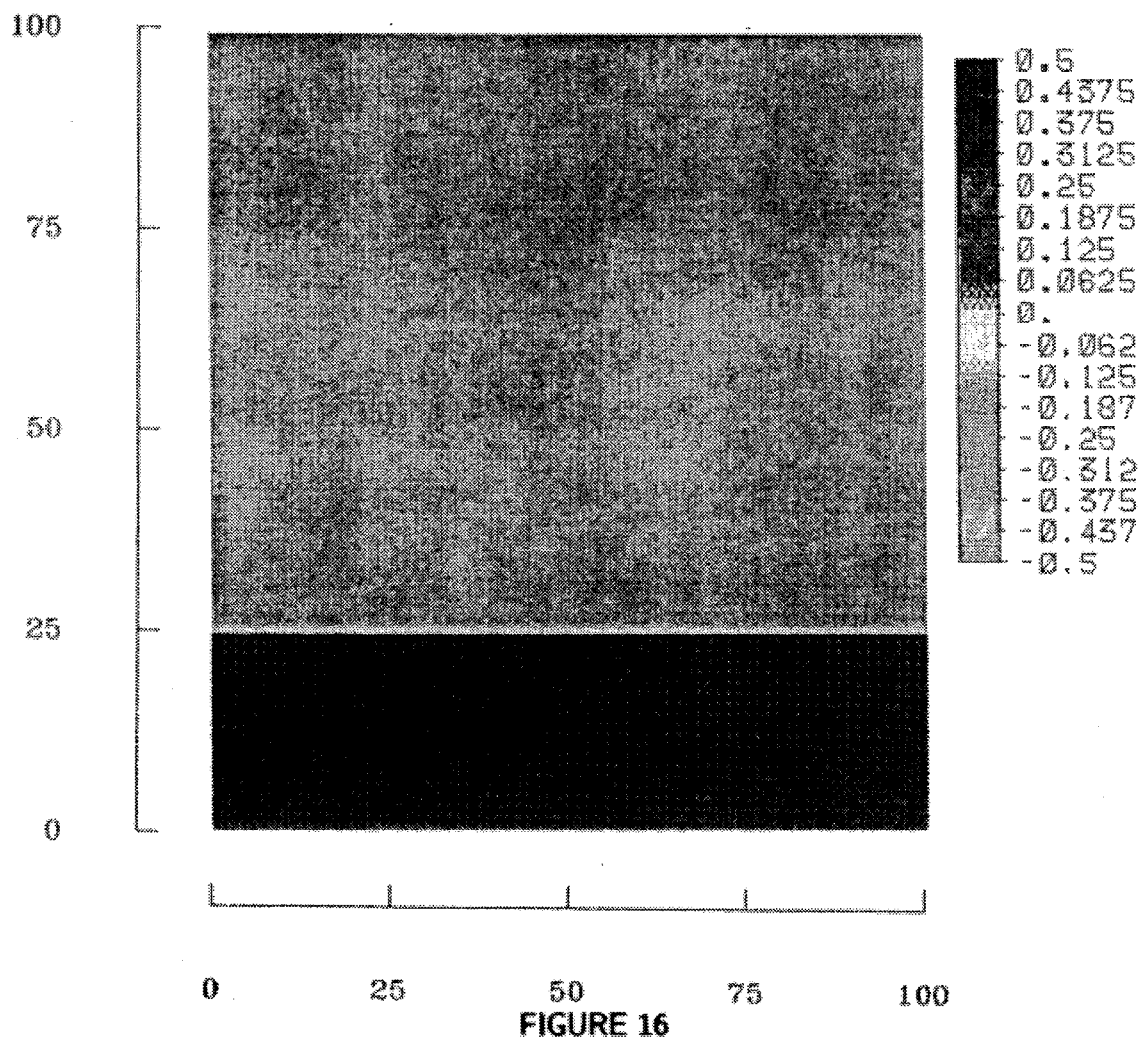
FIG. 16 is one-dimensional variation in a medium, middle layer (interior) has propagation velocity 57.7% of exterior.

The variation of media wave speed $\alpha(x,z)$ for an example of layered media is depicted in FIG. 16. The middle layer has a thickness of 50 distance units and $\alpha=0.5$. The exterior layers have $\alpha=-0.5$. This corresponds to the interior layer having a wave propagation speed 57.7% of the exterior media. Only the first quadrant of the 128 by 128 point grid is shown in FIG. 16. Since the point source will be located at the origin, the solutions of the IDDM will be symmetric and first quadrant displays will show all the results.

Figure 17:
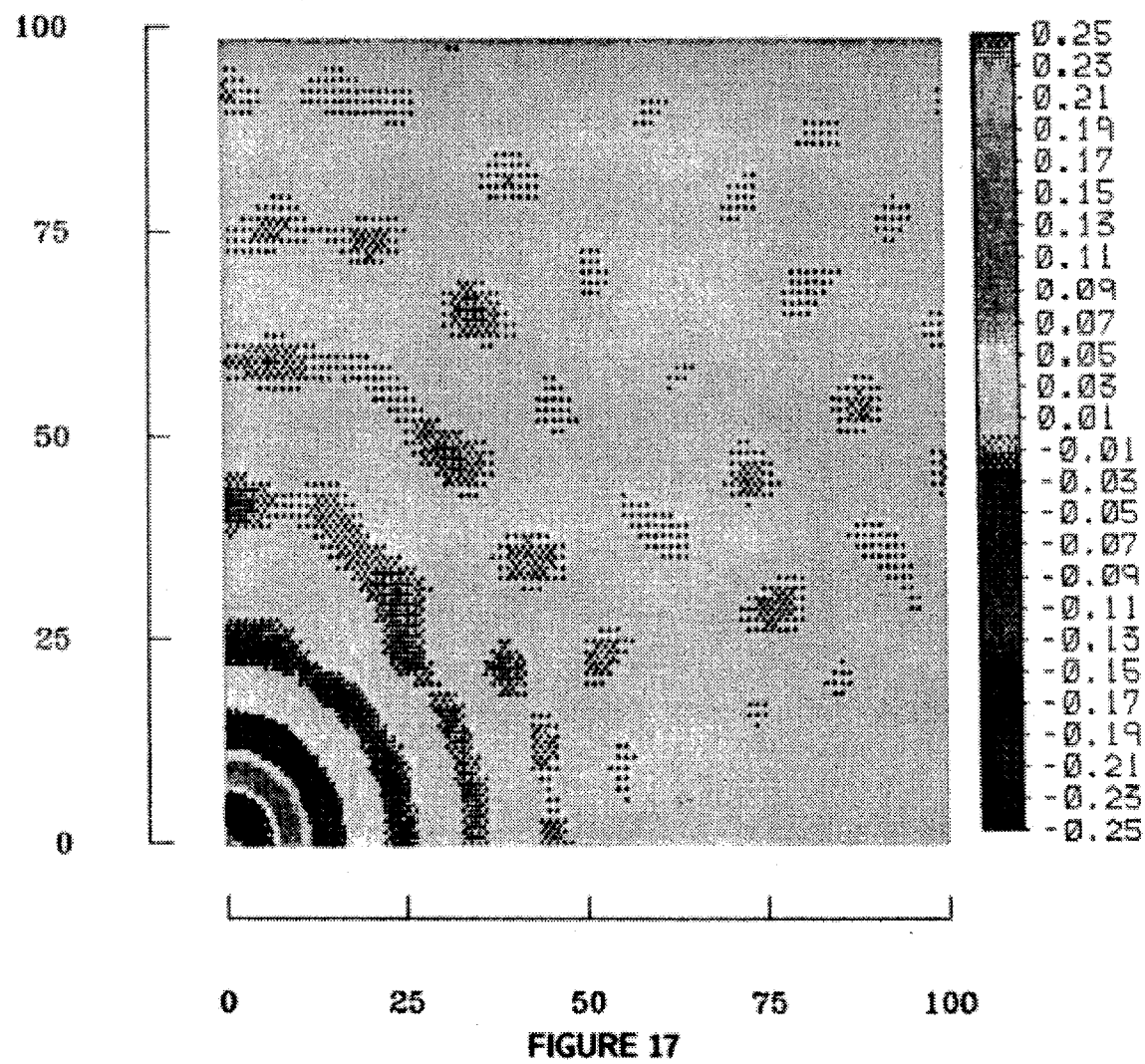
FIG. 17 is wavelength of Re(G) increases in a higher speed exterior medium, $k_0 = 0.5 - 0.055_j$.
Figure 18:
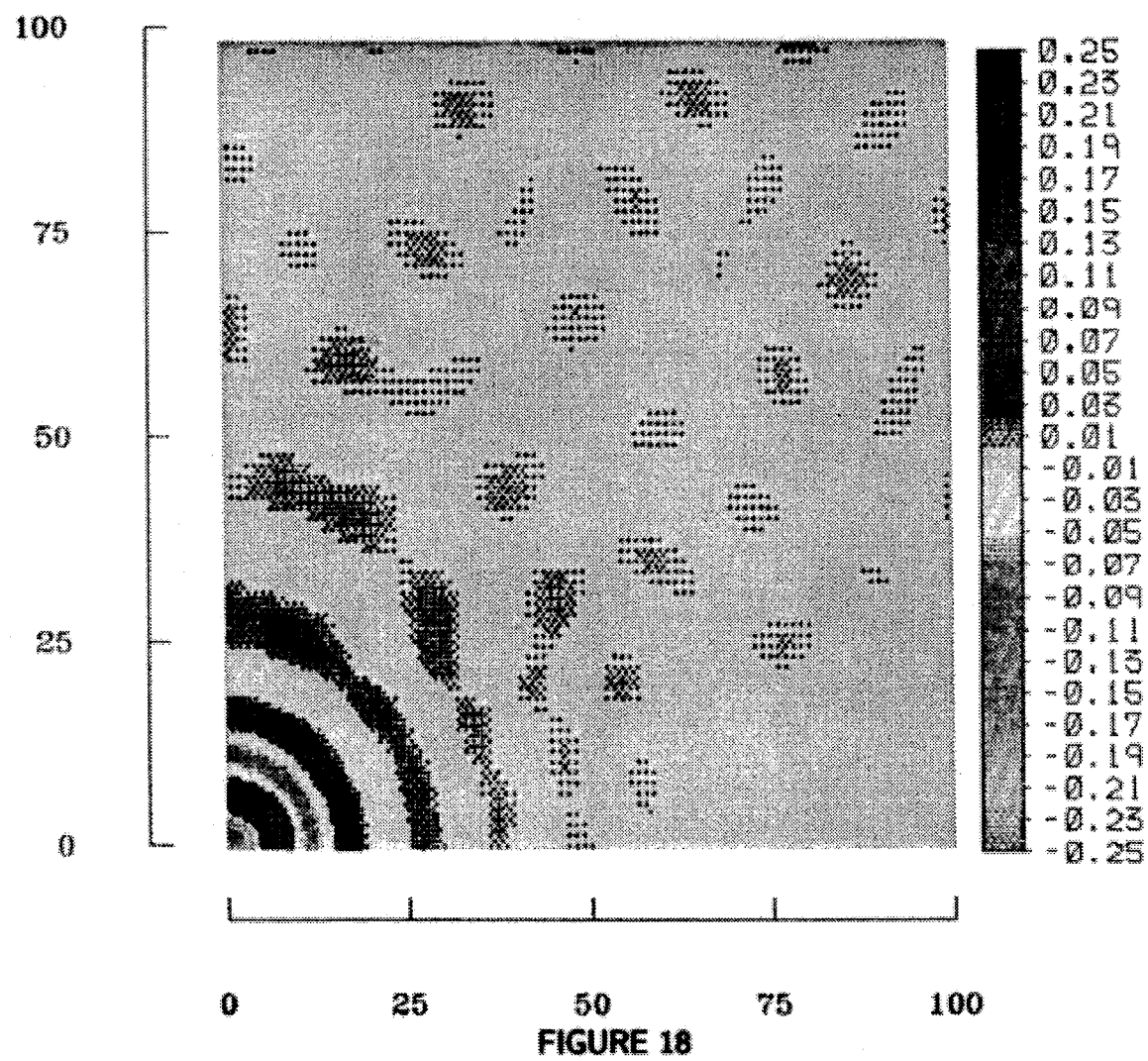
FIG. 18 is wavelength of Im(G) increases in a higher speed exterior medium, $k_0 = 0.5 - 0.055_j$.

FIGS. 17 and 18 display the results of 30 iterations of the IDDM for a point source at the origin in the layered media of FIG. 16. These results are for $k_0=0.5-0.55_j$. Both real, FIG. 17, and imaginary, FIG. 18, parts of the computed Green's function show the penetration of the waves into the higher speed exterior media and the corresponding increase in wavelength. Some interference effects near the media interfaces are also visible.

Figure 19:
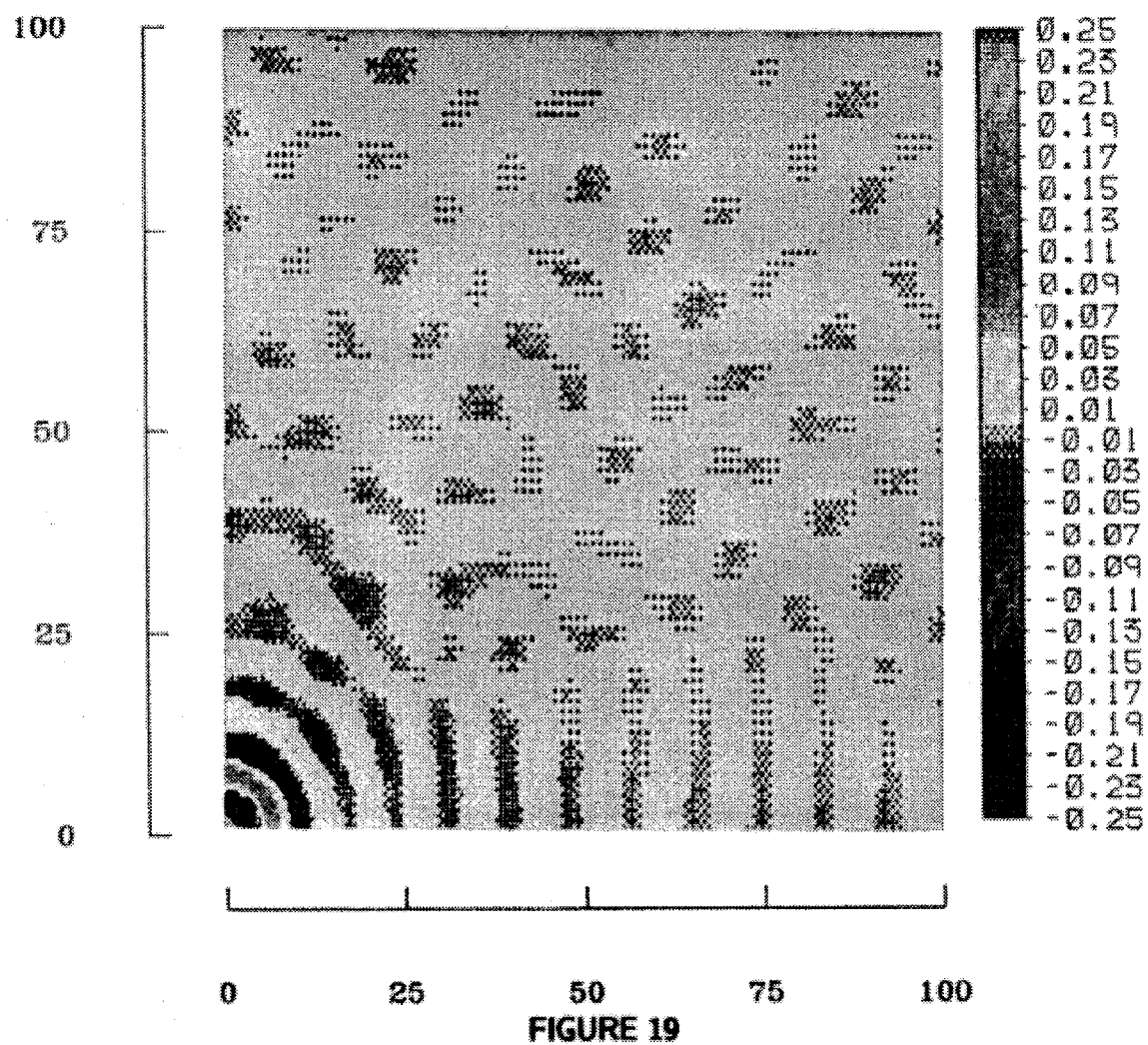
FIG. 19 is slower speed interior layer begins to act as a (leaky) waveguide for Re(G) at $k_0 = 0.7 - 0.07_j$.
Figure 20:
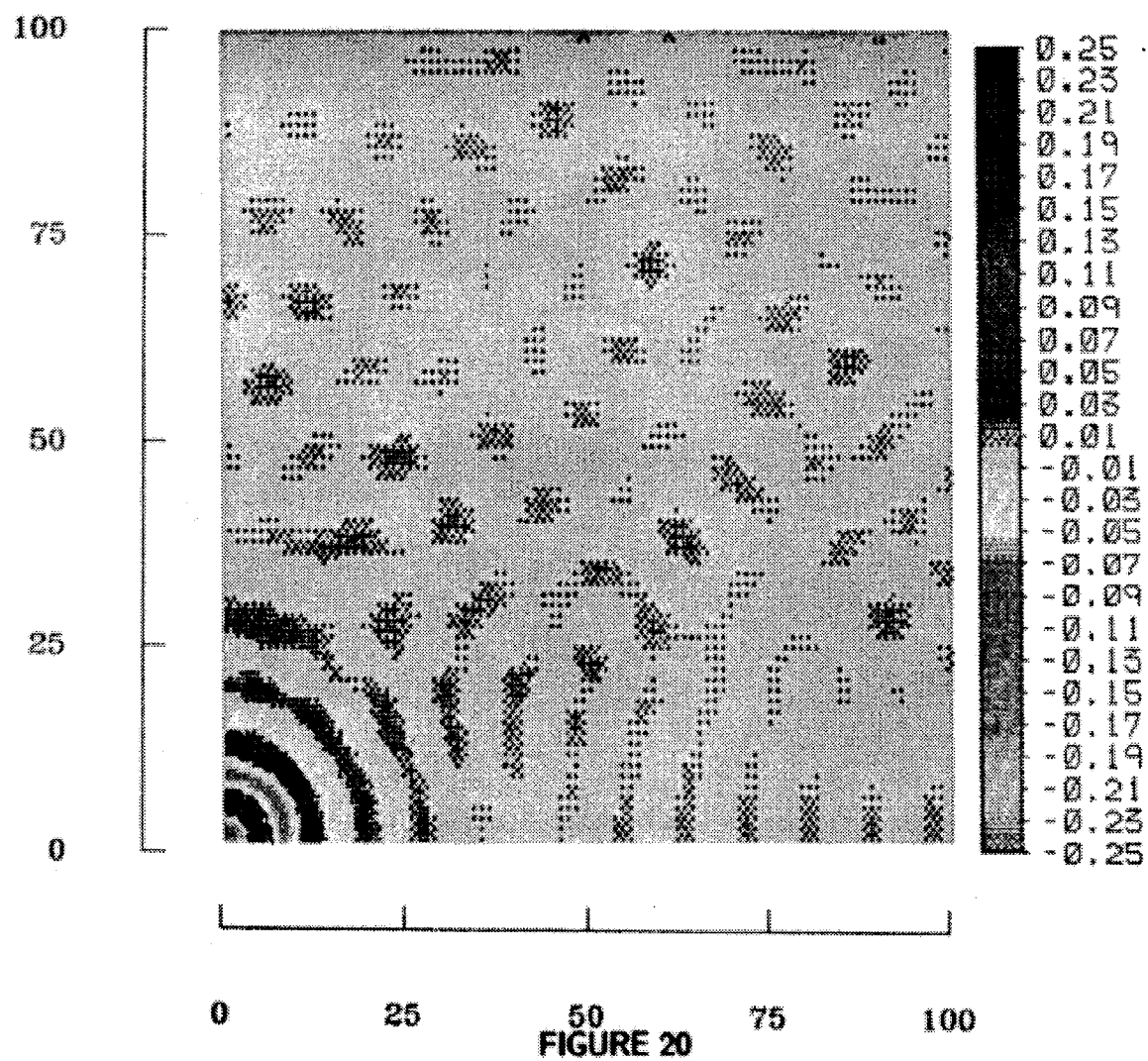
FIG. 20 is slower speed interior layer begins to act as a (leaky) waveguide for Im(G) at $k_0 = 0.7 - 0.07_2$.

Moving up in frequency to $k_R=0.7$ when $k_0=0.7-0.07_j$, FIGS. 19 and 20 illustrate the IDDM computed Green's function at this higher frequency also using 30 iterations. Although significant wave energy continues to escape into the higher speed exterior media, the lower speed interior layer is beginning to guide the waves down its length. Note the planer wavefronts of the guided waves and the clear interference effects near the media interfaces. Also note that despite the high "damping factor", $k_j=-0.07$, used, the guided wave attenuation is still relatively slight. This causes not totally insignificant wave energy to propagate across a wrap boundary resulting in increased computational errors. Experience with the IDDM suggests that most of the "splotches" in the upper right-hand corners of FIGS. 19 and 20 are actually noise predominantly due to this source of error.

Figure 21:
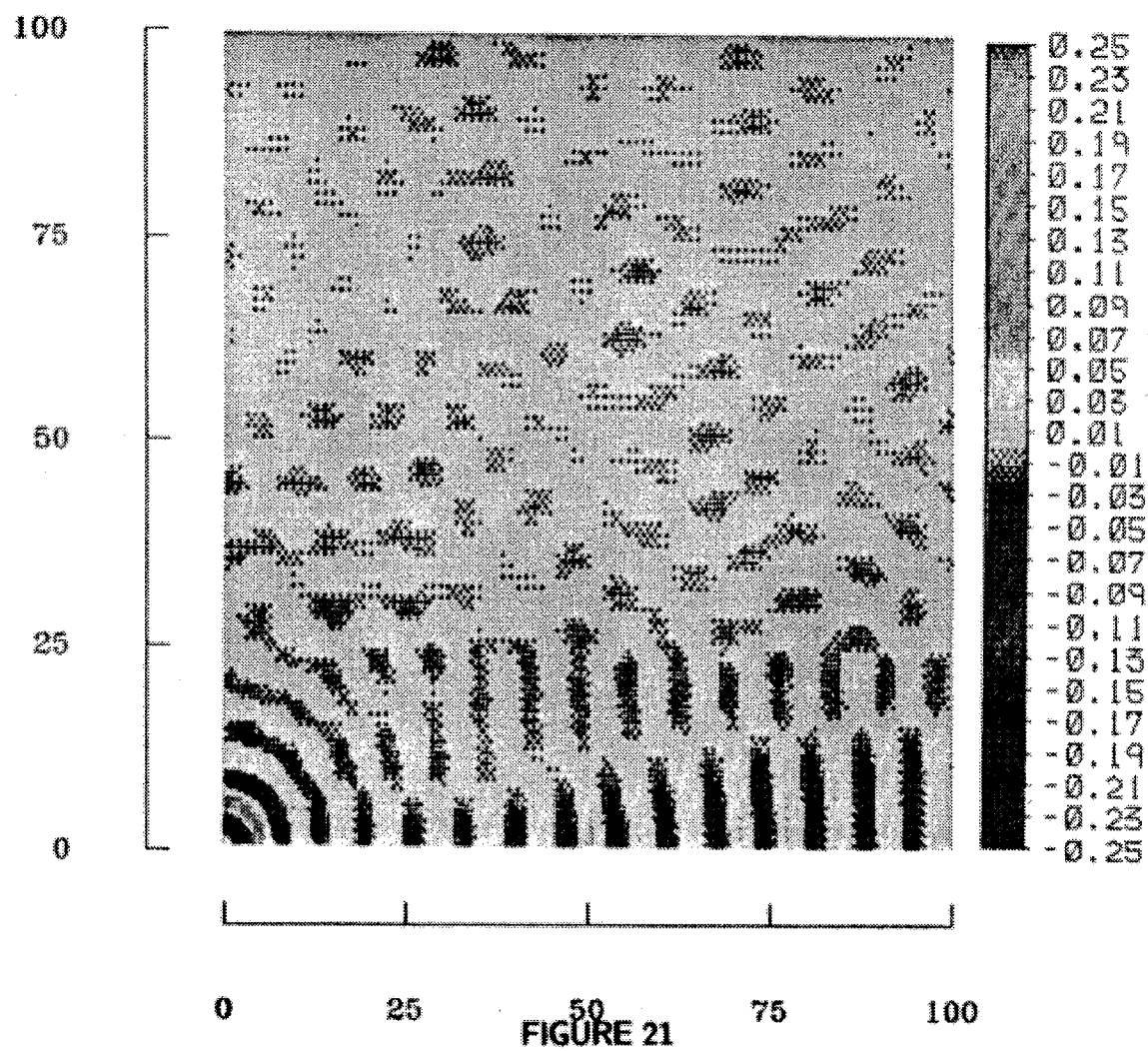
FIG. 21 is the guided mode behavior of Re(G) in slow speed layer at $k_0 = 0.9 - 0.085_j$.
Figure 22:
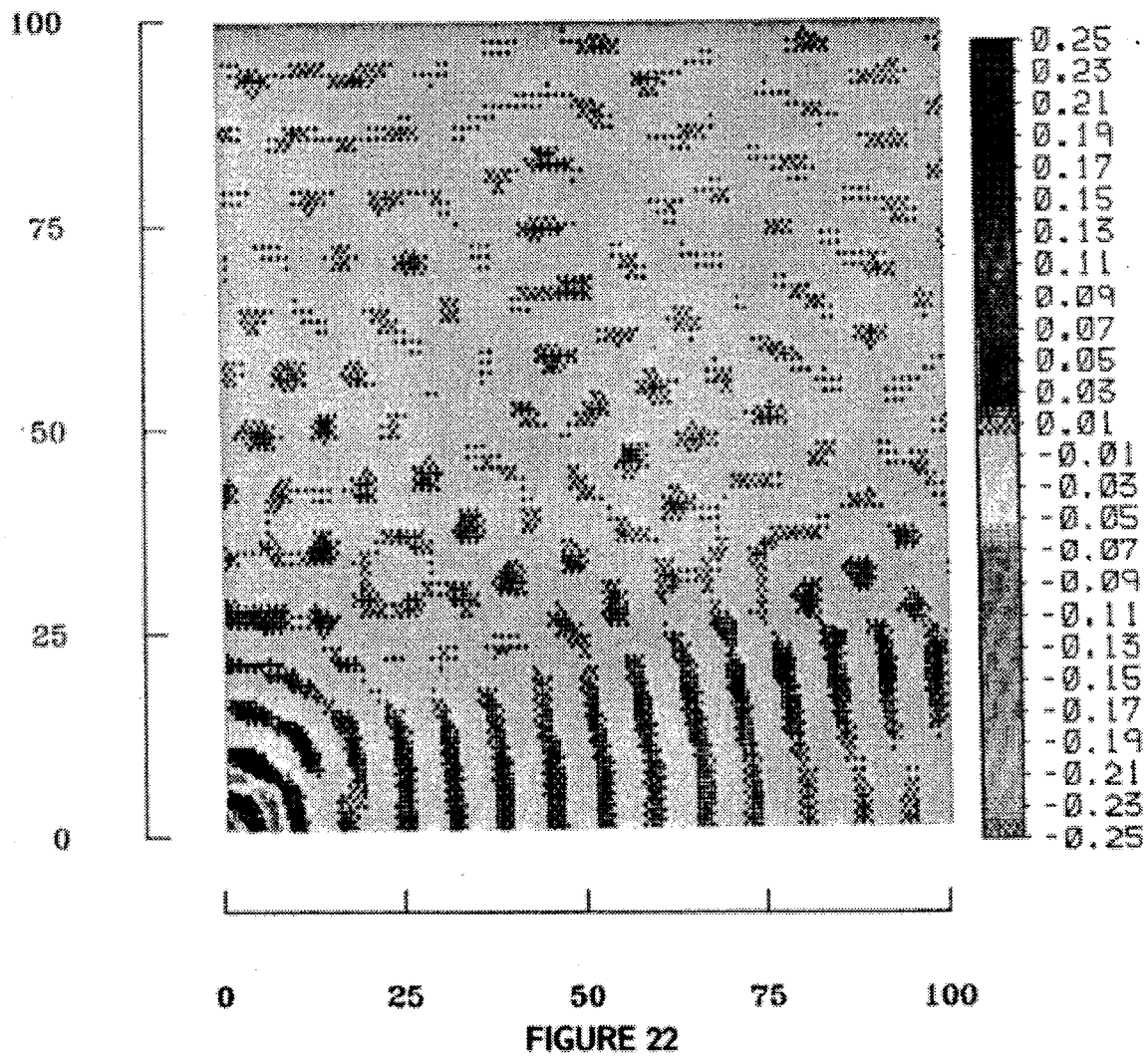
FIG. 22 is the guided mode behavior of Ira(G) in slow speed layer at $k_0 = 0.9 - 0.085_j$.
Figure 23:
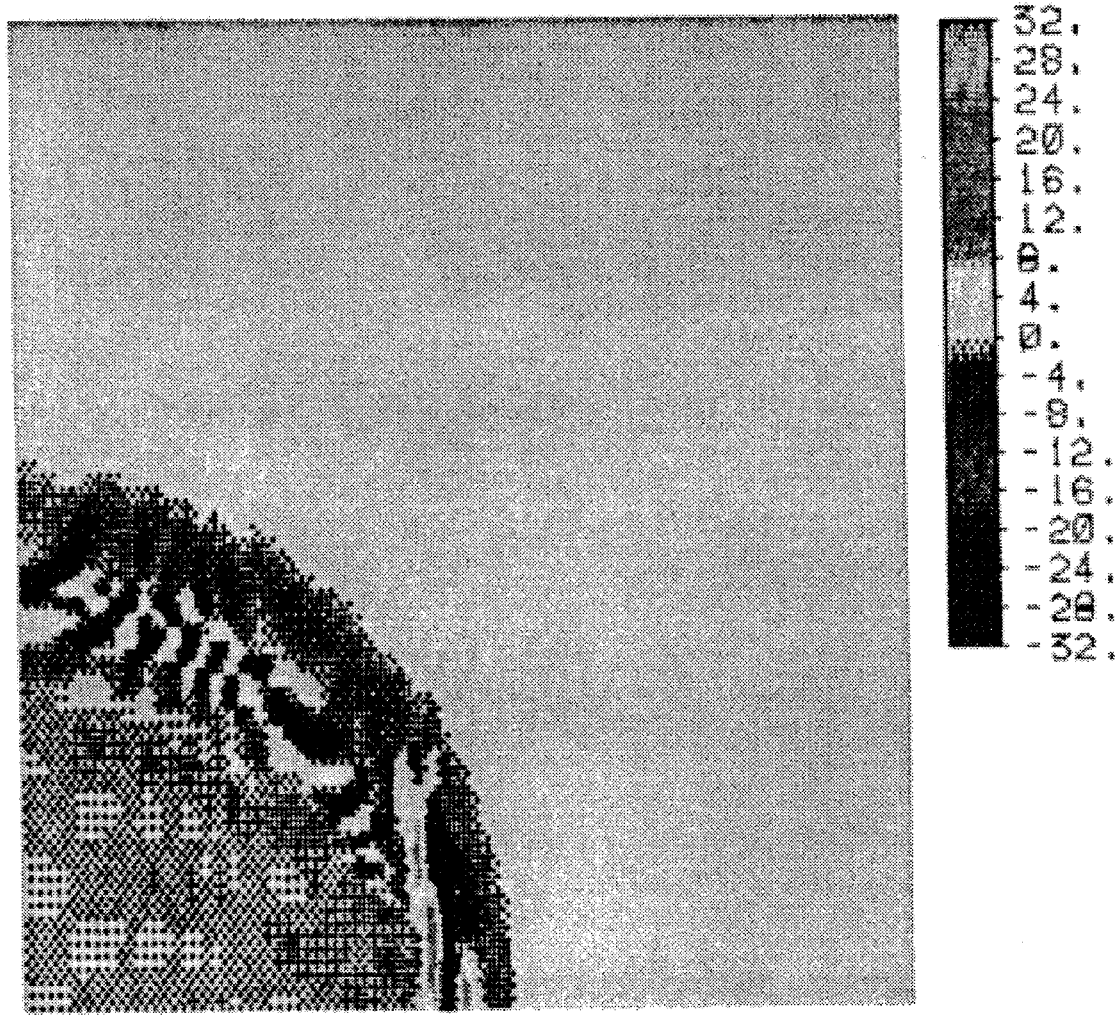
FIG. 23 is the first quadrant of Re $\mathcal{F}\{G\}$) for layered a medium case with $k_0 = 0.9 - 0.085_j$.
Figure 24:
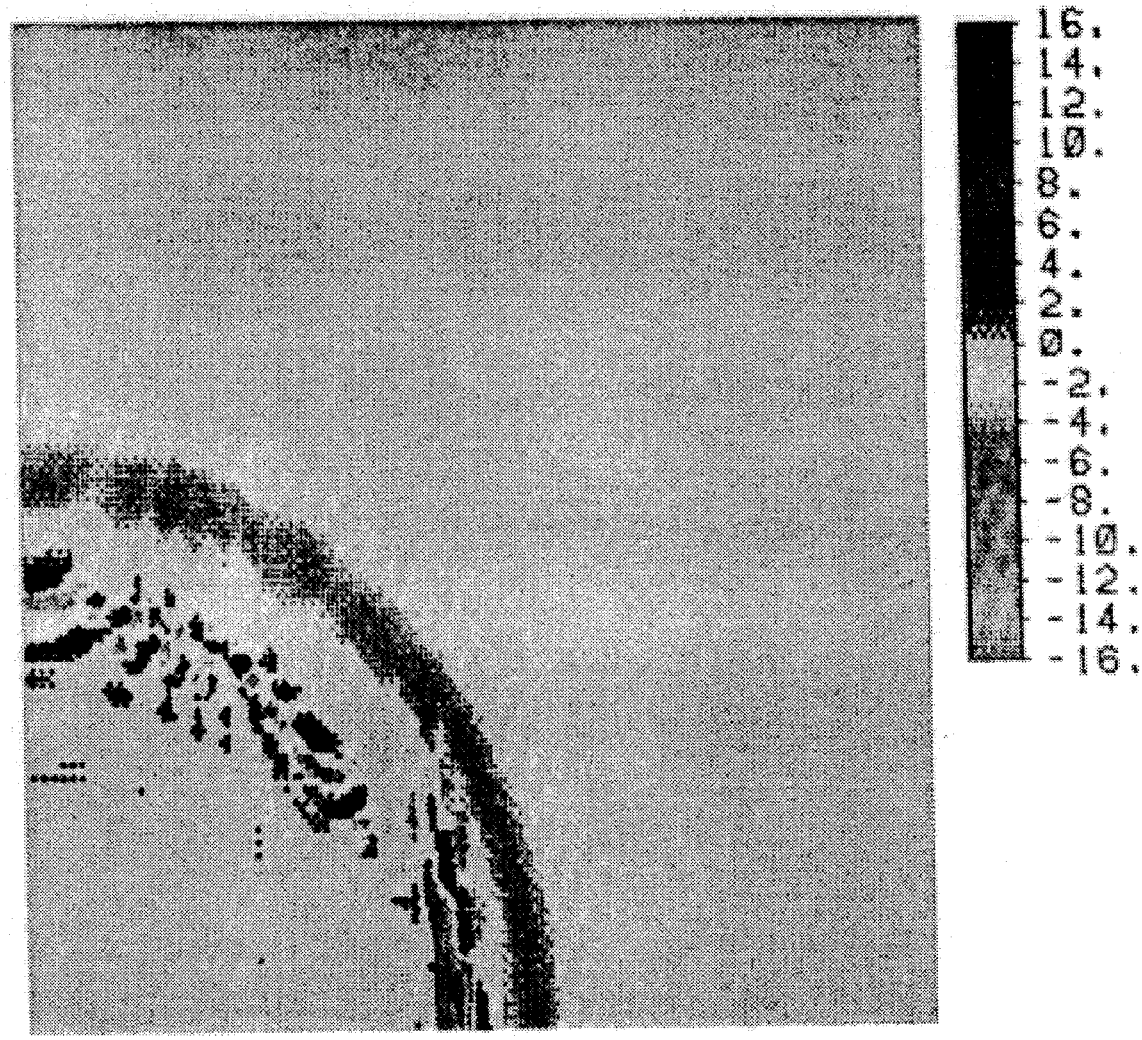
FIG. 24 is the first quadrant of Im $\mathcal{F}\{G\}$) for layered a medium case with $k_0 = 0.9 - 0.085_j$.

Finally, moving up in frequency to $k_R=0.9$ with $k_0=0.9-0.085_j$, results in the real and imaginary parts of the Green's function shown in FIGS. 21 and 22, respectively. Here the waves are almost entirely trapped inside the slower speed layer. Both the real and imaginary parts show the formation of planer guided waves and pronounced interference patterns near the point source. More so than in the previous example, FIGS. 19 and 20, significant wave energy crosses a wrap boundary, even with $k_j=-0.085_j$, causing increased error. The computation of practical waveguide problems with the IDDM will require the use of extended grids and spatial extents in the waveguide directions. The Fourier transform of the results of FIGS. 21 and 22 are illustrated in part by FIGS. 23 and 24. FIG. 21 depicts the real part of $g_n$. The imaginary part is shown as FIG. 22. Note the high amplitude "ridges" near the right-hand sides of the main circular features in both FIGS. 23 and 24. As in the scattering example, the orientation of these ridges in $\Omega_z,\Omega_x$ space is perpendicular to the axis of high amplitude wave propagation in untransformed x,z space. There are also horizontal striations in FIGS. 23 and 24. These are most likely due to the (vertically) planer wavefronts in untransformed space, FIGS. 21 and 22.

INHOMOGENEOUS MEDIA WITH A STRONG INFLUENCE ON A BODY'S NEARFIELD RADIATION

Figure 25:
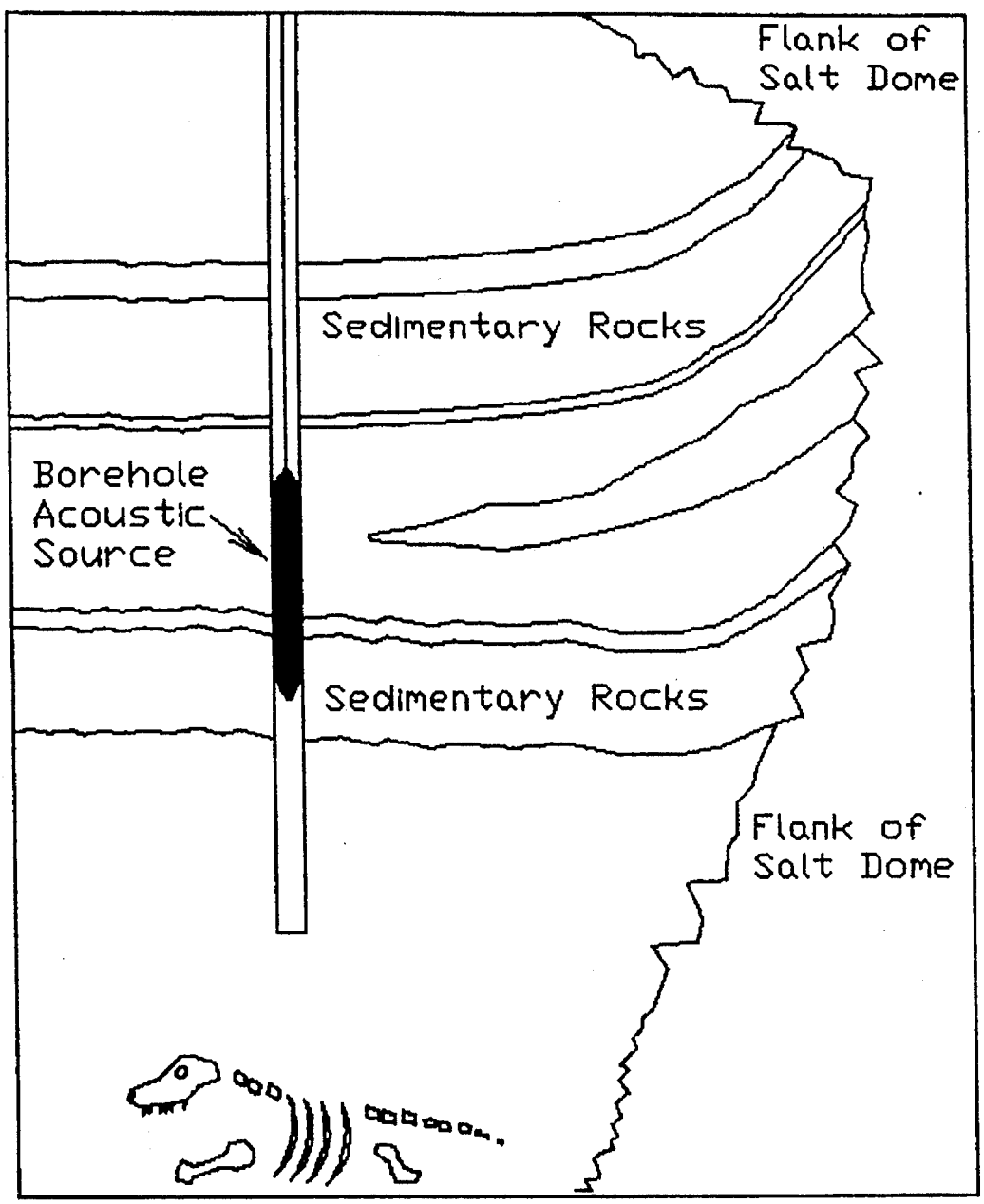
FIG. 25 is a borehole acoustic source example.

FIG. 25 shows an example where the inhomogeneities of the media may be expected to exert a strong influence on the nearfield wave radiation from the body. This particular example is drawn from geophysical acoustics and depicts a borehole acoustic source used in well-logging and vertical seismic profiling. The acoustic source is embedded in the inhomogeneous media with perhaps strong wave propagation velocity contrasts occurring along the body's length. Further, the salt dome flank to the right of the diagram represents a strong reflector that could send much of the energy radiated from the body back to it.

This is an example where nearly all simplified methods, i.e. ray theoretical and range invariant methods, will not work. Candidate methods traditionally include finite elements and finite differences. A possible alternative is to use the IDDM to calculate the Green's functions needed for a boundary element method. The calculation of these Green's functions would have to be done on a grid covering the spatial extent of the inhomogeneous media that significantly influenced the body's nearfield radiation. Also, for a body divided up into M elements, M such grids of Green's functions would have to be found. After order $M^3$ computations solving the matrix system, the boundary element method will then have solved for the potential values on the body's boundary. Calculation of N field points using a BEM would further require finding NM Green's functions each on a substantial grid.

Reconsidering this approach, one realizes that the field points could be calculated directly from the boundary potentials using the IDDM, thus avoiding the work of the second stage BEM computations. One almost immediately further realizes that the whole boundary element computation is itself superfluous in this case. Whenever the calculation of the Green's functions for the radiating body's boundary elements would require large spatial extents at high resolution, it pays to recast the problem so it can be solved by the IDDM directly. In other words, instead of considering the body as a surface with an array of sources and panels of impedance values, the body would be treated as an equivalent region of inhomogeneous media and source points.

Finite elements, finite differences, and the Iterative Dual Domain Method all can be used to solve the Helmholtz equation in a medium with almost arbitrary spatial variation in wave propagation speed. Although the IDDM might be perhaps somewhat trickier to deal with at the edges of the computational domain, it has one great advantage: speed. Both finite element and finite difference methods require computational effort of order $N^3$, where N is the number of field points calculated. Letting I represent the number of iterations required, the Iterative Dual Domain Method is of order $IN \log_2 N$. Typically $30<I<50$, so effectively the IDDM is of order $N \log_2 N$.

The particular implementation of the IDDM shown here employed multidimensional FFT and IFFT algorithms based on the Danielson-Lanczos FFT formula. Any good FFT algorithm could have been used with roughly equivalent results.

INHOMOGENEOUS MEDIA WITH A WEAK INFLUENCE ON A BODY'S NEARFIELD RADIATION

Figure 26:
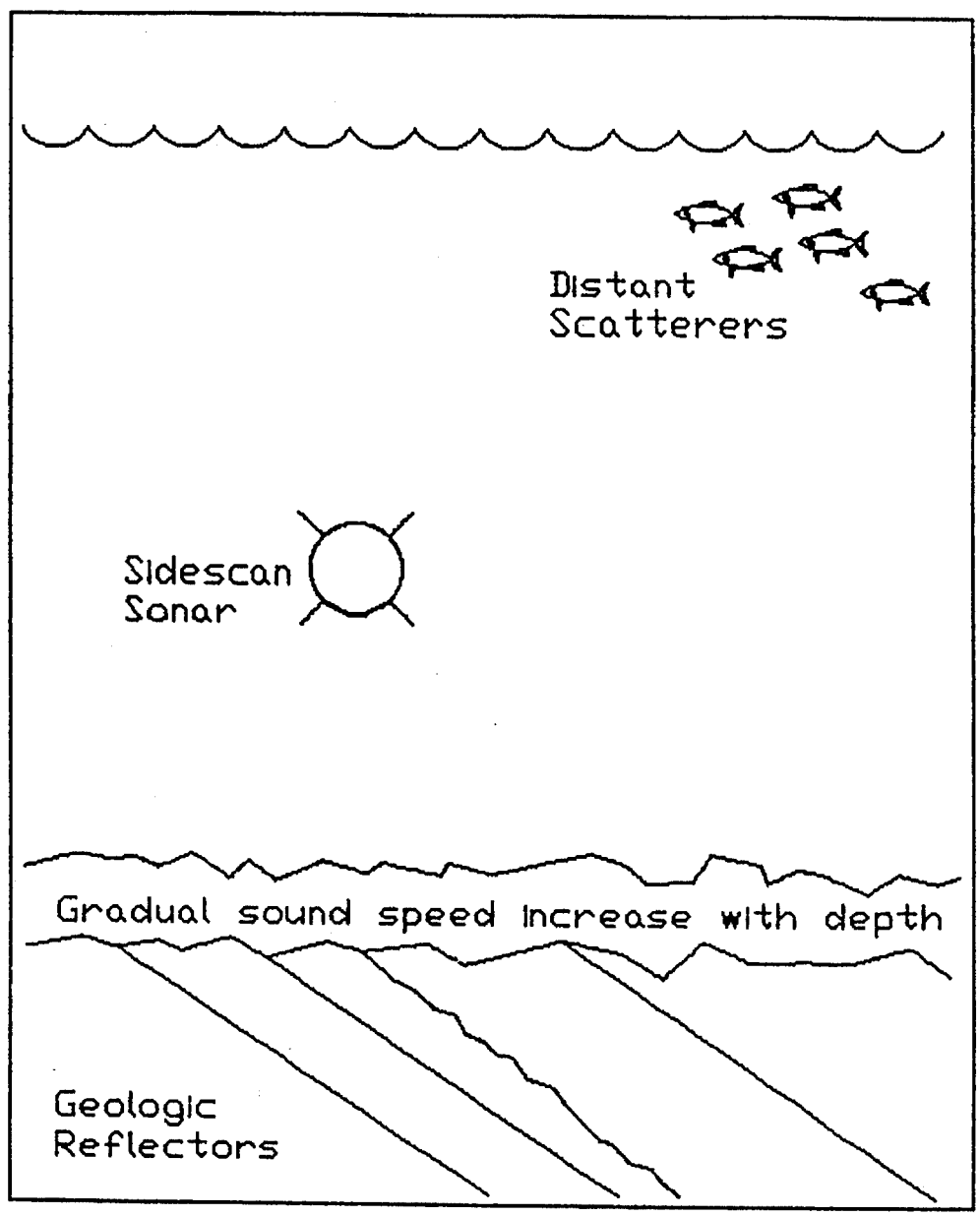
FIG. 26 is a sidescan sonar example.

Many, if not most, inhomogeneous media wave propagation problems occur in a setting where the influence of the spatial variation of the media's wave propagation speed on the nearfield emission from a radiating body is small. Such a common situation is illustrated in FIG. 26. The example of FIG. 26 is drawn from underwater acoustics and depicts a sidescan sonar as used in sub-bottom profiling and geophysical site surveys. The acoustic source is typically located on the bottom of the sidescan sonar towbody. The acoustic media around the towbody is nearly uniform for some distance. Beyond this distance, the acoustic environment has considerable variation in wave propagation speed. Ocean bottom sediments, geologic formations, and assorted distant scatterers, all contribute to the far field radiation pattern.

Unlike the example of the previous section, this kind of problem is amenable to a hybrid boundary element method and Iterative Dual Domain Method approach. Taking the transducer source strengths and the acoustic impedances of the surfaces of the towbody as known, the acoustic field could be computed using a hybrid BEM and IDDM approach. Since the inhomogeneities of the media are assumed not to significantly influence the nearfield of the body, the equivalent acoustic source strengths on the surfaces of the towbody could be found using; a conventional homogeneous media boundary element method. This configuration of source strengths on, say M boundary elements comprising the towbody could then be used as the source term in the IDDM to compute the acoustic field in the homogeneous media. Alternatively, if one wanted to examine the effects of the individual boundary elements on the far field of radiation pattern, one could compute the Green's function for each boundary element source, weigh each result, and sum, since the principle of superposition holds.

The hybrid boundary element method with the IDDM is of order $M^3$ to solve for the boundary element source strengths and then of order $N \log_2 N$ to solve for the field points. If the influence of each boundary element is examined separately and then a total solution found, the field point computation would require on the order of $MN \log_2 N$ operations, only slightly more work than the order MN field point calculations in conventional homogeneous media boundary element methods.

HIGHER DIMENSIONS

Although the examples in this discussion were all two-dimensional, the derivations of the boundary element method and the development of the IDDM are completely general with respect to the dimensions. The methods described should work equally well in three-dimensions (or higher) as in two-dimensions. The actual coding and implementation becomes more difficult as the number of dimensions increases. This is due to much larger memory and storage requirements, more complicated indexing, and (of course) substantially more difficult display and visualization of input data and results. The data organization with respect to wrap around ordering in the IDDM can become particularly tricky in higher dimensions. Despite these difficulties, which are characteristic of many numerical methods with increasing; dimension, the Iterative Dual Domain Method allows the solution of wave propagation problems, previously only within reach of the largest supercomputers, on modest computer workstations.

A particularly advantageous implementation of the IDDM process can be seen from the flow chart for the analysis process in FIG. 1. It should be noted that the process essentially consists of reducing the desired data whether sonar or seismic, to an array of data points and then iterating these data points through the described procedure using a sequence of forward and reverse discrete Fast Fourier Transforms. It should be noted that this is ideally suited for implementation in the current generation of digital signal processing chips, all of which are optimized to perform Fast Fourier Transforms on data and therefore which can be readily programmed to perform the described process on the data array in very high speed form in very compact situation. Thus, this gives rise to the possibility of the process being encapsulated within a single digital signal processor chip and incorporated within sonar or seismic gear for near real time analysis and visualization of the sampled sonar or seismic data.

Geophysical surveys, for example, typically image the area of interest using arrays of acoustic, vibrations, magnetic, electric, nuclear, or gravitational sensors with corresponding man-made or natural sources. In order to determine survey performance, effective planning of these surveys requires the use of advance information, such as known geological data, previous surveys and the like regarding the prospective area, and the modelling of various arrangements of sensors and sources until the best, or least objectionable, configuration could be found. Typical forward modelling processes of the prior art are usually of order $N^3$ complexity and require large supercomputers to seek suitable sensor and source configurations. Significant cost, imaging, and efficiency improvements are possible if the forward modelling process would be performed quickly in the field using information gathered as the survey progressed to improve sensor and source configuration and operations. The inventive process, being easily implemented in modest size and cost software, or in digital signal processing hardware will allow this forward modelling of seismic data acquisition in the field. This capability will result in improvements in image quality, survey efficiency, and economics.

As with acoustic fields and seismic surveys, prediction of electromagnetic field intensity is easily performed by the process. A principal possible use is in the field of behavior prediction of electromagnetic fields within integrated circuits. Typically this is now performed by finite element methods (FEM) or other electromagnetic codes. Since the media is the integrated circuit chip, and since the wave velocities in chip materials are well understood, the inventive process may be used to directly predict and show the field propagation throughout the chip and its package for any frequencies of interest. The solution time is vastly superior to a full FEM analysis. The use of DSP chips would permit a dedicated simulator of chip behavior to be constructed at relatively low cost, and with very high performance.

A further area for use of the process for electromagnetic signals is in the area of forward prediction of radar beaming, where predicted signal propagation is used to form or shape the radar beam to improve signal to noise characteristics, and to improve resolution of the received display. Long range propagation is affected by the temperature gradients in the atmosphere, and by the upper boundary of the ionosphere and the the lower boundary of the earth's surface. These are all fairly well characterized data, drawn from weather data and from radio propagation predictions. Currently, solution and forward prediction of the radar field requires supercomputer codes and extensive time. The inventive process can provide solutions and waveform prediction in short time frames, and may make practicable near real-time beam formation techniques.

An important component of flight simulation is the simulation of radar images from other air traffic, weather, and ground features. The inventive process allows for the rapid and low cost approximation of backscatter radar signals from simulated inhomogeneities. The incorporation of the inventive process into flight and air traffic control simulators will permit more realistic radar image simulation. Just as these techniques can improve flight simulation, sophisticated graphics techniques and hardware have allowed the visual simulation of various environments.

This includes the growing field of virtual reality. The inventive process permits the real-time simulation of the corresponding acoustic environment, improving the overall simulated experience. Thus, it can be seen that whereas the described implementations have been primarily concerned with point source fields and acoustic sensing, the process is equally applicable to any situation in which an array of discrete sampled acoustical data or the like must be processed to reflect the real world inhomogeneities in the media through which it is transmitted, or, alternately, processed to extract the effects of the real world media from the transmission of the signal to accurately replicate a visualization of the sensed area.

I claim:

1. A process for modelling an acoustic or electromagnetic field at a given wave number in an inhomogeneous medium comprising:

setting a grid of locations within the medium, $\bar{x}$, determining a medium model set of data points corresponding to the wave field, $G_0(\bar{x})$, and the wave velocity in a homogeneous medium at each said location;

forming sequentially a fixed number of perturbed data sets $\alpha_1(\bar{x})G_0(\bar{x}), \ldots, \alpha_n(\bar{x})G_{n-1}(\bar{x})$, each intermediate a set of data points corresponding to the homogeneous medium and the n-th medium model of data points; for each said perturbed data set, the data corresponding to a location sequentially changing from the data for a homogeneous medium to the data in the n-th medium model;

said perturbed data sets being the product of a step-wise increasing perturbation function, $\alpha(\bar{x})$, and the initial homogeneous medium model and iteratively successively produced approximate models;

forming the Fast Fourier Transform $\mathcal{F}\{\alpha_m(\bar{x})G_{m-1}(\bar{x})\}$ of said product;

forming the transformed product $$\frac{-1 - \kappa_0^2 \ \{\alpha_m(\bar{\bar{x}})G_{m-1}(\bar{\bar{x}})\}}{\kappa_0^2 - |\bar{\Omega}|^2}$$

where $\kappa_0^2$ is the constant part of the wave number squared and $\bar{\Omega}$ is the transformed space coordinates;

forming the Inverse Fast Fourier Transform of the transformed product to produce a new approximate model;

repeating the procedure n times; and:

outputting the resulting n-th model against the chosen location grid, $\bar{x}$, as the wave field model of the acoustic or electromagnetic field.

2. A process as in claim 1, where the perturbation function is $\alpha(\bar{x})$ and is expressed as $$\alpha(\bar{x}) = \frac{\kappa^2(\bar{x})}{\kappa_0^2} - 1$$

where $k_0^2$ represents the constant part and $k^2$ represents the variable part of the wave number squared.

3. A process for modelling; an acoustic or electromagnetic field at a given wave number in an inhomogeneous two-dimensional (x,z) medium comprising the steps of:

forming as an input parameter an approximation to the field solution $G_{m-1}(x,z)$, said initial approximation being in the form of a set of data points corresponding; to the wave field at a grid of locations for a homogeneous medium, perturbing the set of data points with the wave number perturbation function $\alpha_m(x,z)$ by forming the product $\alpha_m(x,z)G_{m-1}(x,z)$ where $\alpha_m(x,z)$ is a sequence such that $\alpha_0(x,z)=0$ and $\alpha_n=\alpha(x,z)$, forming the Fast Fourier Transform of the product:

$\mathcal{F}\{\alpha_m(x,z)G_{m-1}(x,z)\}$:

forming the product $$\frac{-1-\kappa_0^2 \mathcal{F}\{\alpha_m(x,z)G_{m-1}(x,z)\}}{\kappa_0^2 - (\Omega_x^2 + \Omega_z^2)}$$

where $k_0^2$ is the constant part of the wave number squared and $(\Omega_x, \Omega_z)$ are the transformed coordinates for $(x,z)$, producing the Inverse Fast Fourier Transform of the resultant product to provide a revised approximation to the field solution, $G_m(x,z)$, providing the revised approximation $G_m(x,z)$ as the input parameter and repeating the procedure n times, at each repetition, step-wise increasing the perturbation function $\alpha_m(x,z)$, and at the end of n repetitions, outputting the resulting field against the location grid as the desired acoustic or electromagnetic field.

4. The process of claim 3 where n is between 30 and 45.

5. A process of claim 4 including the additional step of adapting a sensor array in accordance with the resulting model field at the grid locations.

6. A process of claim 4 further including deploying an array of sensors in accordance with the resulting model field, propagating a wave in the medium, resending the signals received by the sensor arrays, and comparing the results obtained from the sensor array with the resulting model field of an acoustic or electromagnetic field.

7. A method for producing a model of an acoustic or electromagnetic field in a three-dimensional inhomogeneous medium comprising the steps:

expressing for said inhomogeneous medium having a spatially varying wave velocity its spatially varying wave number squared as $$\kappa^2 = \frac{\omega^2}{c^2(x,y,z)} = \kappa_0^2[1 + \alpha(x,y,z)]$$

where $k^2$ is the wavenumber squared and is a function of position $(x,y,z)$ with a constant part of $k_0^2$ and a varying part $k_0^2 \alpha(x,y,z)$ and determining a perturbation function $\alpha(x,y,z)$ $$\alpha(x,y,z) = \frac{\kappa^2(x,y,z)}{\kappa_0^2} - 1$$

defining a sequence of $\alpha_m$'s such that $\alpha_0=0$ and $\alpha_n=\alpha(x,y,z)$, approximating the wave field for a homogeneous medium $G_0(x,y,z)$;

performing the following operation iteratively n times;
(a) form the multiplicative product of the wave number perturbations $\alpha_m(x,y,z)$ and the approximation of the wave field $G_{m-1}(x,y,z)$ to produce $\alpha_m(x,y,z)G_{m-1}(x,y,z)$,
(b) form the Fast Fourier Transform of the product obtained in substep (a) to produce $$\mathcal{F}\{\alpha_m(x,y,z)G_{m-1}(x,y,z)\}$$

(c) multiply $\mathcal{F}\{\alpha_m(x,y,z)G_{m-1}(x,y,z)\}$ by the constant component of the wave number squared $k^2$ and subtract from $-1$ to produce $$-1-k_0^2 \mathcal{F}\{\alpha_m(x,y,z)G_{m-1}(x,y,z)\}$$

and divide by $k_0^2-(\Omega_y^2+\Omega_x^2)$, where $(\Omega_x, \Omega_y, \Omega_x)$ are the transformed coordinates of $(x,y,z)$ to obtain $$\frac{-1-\kappa_0^2 \mathcal{F}\{\alpha_m(x,y,z)G_{m-1}(x,y,z)\}}{\kappa_0^2 - (\Omega_x^2 + \Omega_y^2 + \Omega_z^2)}$$

(d) form the Inverse Fast Fourier Transform of the result of substep (c) to produce a revised field approximation $$G_m = \mathcal{F}^{-1}\left\{\frac{-1-\kappa_0^2 \mathcal{F}\{\alpha_m(x,y,z)G_{m-1}(x,y,z)\}}{\kappa_0^2 - (\Omega_x^2 + \Omega_y^2 + \Omega_z^2)}\right\}$$

when m=n outputting the final approximation as the model.

8. The process of claim 7 wherein n is between about 30 and 45.

9. The process of claim 7 further including using the model of the expected wave field for deploying the sensors in a geophysical prospecting system.

10. The process of claim 3 including the step of providing a probability density wave field as the field.

11. The process of claim 7 including the step of providing a probability density wave field as the acoustic or electromagnetic field, 12. The process of claim 7 including the step of providing a gravity wave field as the acoustic or electromagnetic field.

13. The process of claim 3 wherein the steps of forming the Fast Fourier Transform and producing the Inverse Fast Fourier Transform comprises forming a fast integral transform and its inverse, respectively.

14. The process of claim 7 wherein the steps of forming the Fast Fourier Transform and the Inverse Fast Fourier Transform comprises forming a fast integral transform and its inverse, respectively.

15. The process of claim 13 including the step of providing a probability density wave field as the field.

16. The process of claim 14 including the step of providing a gravity wave or probability density wave field.

17. The process of claim 3 wherein the step of forming the Fast Fourier Transform includes forming the transform in a Fast Fourier Transform processor and the step of producing the Inverse Fast Fourier Transform includes producing the transform in an Inverse Fast Fourier Transform processor.

18. The method of claim 7 including the steps of forming the Fast Fourier Transform and the Inverse Fast Fourier Transform in a Fast Fourier Transform processor and an Inverse Fast Fourier Transform processor, respectively.

* * * * *

UNITED STATES PATENT AND TRADEMARK OFFICE
CERTIFICATE OF CORRECTION

PATENT NO. : 5,471,435

DATED : November 28, 1995

INVENTOR(S) : Richard A. Marschall

Page 1 of 2

It is certified that error appears in the above-identified patent and that said letters patent is hereby corrected as shown below:

Title page, item [73], replace "Marshall" with --Marschall--.

Column 4, replace Equation (59) with $$\nabla^2 u(x,z) + k^2(x,z) \cdot u(x,z) = 0 \qquad (59)$$

Column 5, replace Equation (69) with $$[k_0^2 - (\Omega_x^2 + \Omega_z^2)]g_1 = -1 - k_0^2 \, \mathfrak{F}\{\alpha(x,z)\} \star g_0 \qquad (69)$$

Column 5, replace Equation (71) with $$\alpha_m(x,z) = m\left[\frac{\alpha(x,z)}{n}\right] \quad \forall_m = 0,\ldots,n \quad m,n \in Z^- \qquad (71)$$

Column 5, replace Equation (72) with $$\mathfrak{F}\{\alpha(x,z)\} \star g(\Omega_x,\Omega_z) = \mathfrak{F}\{\alpha(x,z)\} \star \mathfrak{F}\{G(x,z)\} = \mathfrak{F}\{\alpha(x,z) \cdot G(x,z)\} \qquad (72)$$

Column 6, replace Equation (76) with $$[k_0^2 - (\Omega_x^2 + \Omega_z^2)]g_m = -1 - k_0^2 \, \mathfrak{F}\{\alpha_m(x,z) \cdot G_{m-1}\} \qquad (76)$$

Column 6, line 18, replace "If κ$_0$" to end of line with --If κ$_0$ ∈ C--.

Column 14, line 30, replace the equation with :

$$\frac{-1 - K_0^2 \, \mathfrak{F}\{\alpha_m(\bar{x})G_{m-1}(\bar{x})\}}{K_0^2 - |\bar{\Omega}|^2}$$

Column 14, claim 3, line 1, delete " ; ".

UNITED STATES PATENT AND TRADEMARK OFFICE
CERTIFICATE OF CORRECTION

PATENT NO. : 5,471,435
DATED : November 28, 1995
INVENTOR(S) : Richard A. Marschall It is certified that error appears in the above-indentified patent and that said Letters Patent is hereby corrected as shown below:

Column 16, line 6, after "and divide by" replace the first expression with:

$$K_0^2 - (\Omega_x^2 + \Omega_y^2 + \Omega_z^2),$$

Signed and Sealed this

Twenty-ninth Day of October 1996

BRUCE LEHMAN

*Attest:*

*Attesting Officer*    *Commissioner of Patents and Trademarks*